United States Patent [19]
Canfield

[11] Patent Number: 5,967,992
[45] Date of Patent: Oct. 19, 1999

[54] RADIOMETRIC TEMPERATURE MEASUREMENT BASED ON EMPIRICAL MEASUREMENTS AND LINEAR FUNCTIONS

[75] Inventor: Eric L. Canfield, Chester Springs, Pa.

[73] Assignee: TruTex, Inc., West Chester, Pa.

[21] Appl. No.: 09/089,374

[22] Filed: Jun. 3, 1998

[51] Int. Cl.[6] ........................................................ A61B 6/00
[52] U.S. Cl. ............................ 600/474; 600/549; 600/559
[58] Field of Search ..................................... 600/474, 475, 600/473, 549, 559; 374/121, 130, 131, 133

[56] References Cited

U.S. PATENT DOCUMENTS

| | | |
|---|---|---|
| Re. 34,507 | 1/1994 | Egawa et al. . |
| Re. 34,599 | 5/1994 | Susyznski et al. . |
| Re. 34,789 | 11/1994 | Fraden . |
| D. 218,851 | 9/1970 | Sato . |
| D. 246,766 | 12/1977 | Everest . |
| D. 254,959 | 5/1980 | Everest . |
| D. 300,728 | 4/1989 | Ross . |
| D. 303,008 | 8/1989 | O'Hara et al. . |
| D. 317,414 | 6/1991 | Lanci et al. . |
| D. 318,812 | 8/1991 | Matsuura et al. . |

(List continued on next page.)

FOREIGN PATENT DOCUMENTS

| | | |
|---|---|---|
| 66021/86 | of 0000 | Australia . |
| 778199 | 2/1972 | Belgium . |
| 1258052 | 8/1989 | Canada . |
| 1265355 | 2/1990 | Canada . |
| 1314407 | 3/1993 | Canada . |

(List continued on next page.)

OTHER PUBLICATIONS

J. W. Moore et al., "Noncontact tympanic thermometer", *Medical& Biological Engineering& Computing*, vol. 16, No. 5, Sep. 1978, pp. 580–584.

D. E. Lees et al., "Noninvasive Determination of Core Temperature During Anesthesia", *Southern Medical Journal*, vol. 73, No. 10, Oct. 1980, pp. 1322–1324.

J. Fraden et al., "Application of Pyro–Electric Polymer Film to Medical Thermometry," *Proceedings of the Eighth Annual Conference of the IEEE/Engineering in Medicine and Biology Society*, 86CH2368.9, vol. 3 of 3, Fort Worth, Texas, Nov. 7–10, 1986.

(List continued on next page.)

*Primary Examiner*—Jeffrey R. Jastrzab
*Assistant Examiner*—Ali M. Imam
*Attorney, Agent, or Firm*—Nixon & Vanderhye P.C.

[57] ABSTRACT

In contrast to the non-linear systems used in certain past infrared thermometers, the present invention uses an empirical data set to determine patient temperature. The empirical data set provided by the present invention represents actually measured thermometer sensor outputs over a substantial number of target and ambient temperature points within the thermometer's operating range. The empirical data set is collected during a testing process, and is stored in a non-volatile memory within the thermometer. At temperature measuring time, the thermometer accesses the appropriate cell in the non-volatile memory to determine temperature. The substantial size of the empirical data set eliminates guesswork and estimation—since the most accurate indication of how a thermometer will perform under certain conditions is a record of how it previously performed under those same conditions. To reduce total testing time while achieving nearly comparable accuracy, the present invention systematically collects empirical data in sufficient quantities to cover a range of reference target and ambient temperatures. To provide additional resolution, a simple linear function such as averaging (i.e., adding two collected data points and dividing by two) can be used to supply intermediate data points between the empirical points that were collected.

21 Claims, 13 Drawing Sheets

U.S. PATENT DOCUMENTS

| | | |
|---|---|---|
| D. 321,487 | 11/1991 | Manno . |
| D. 329,389 | 9/1992 | Hines . |
| D. 329,395 | 9/1992 | Mackay . |
| D. 329,396 | 9/1992 | Mackay . |
| D. 336,862 | 6/1993 | Ayton et al. . |
| D. 337,534 | 7/1993 | Swift . |
| D. 337,954 | 8/1993 | Makita et al. . |
| D. 338,412 | 8/1993 | Curbbun . |
| D. 342,681 | 12/1993 | Mackay . |
| D. 370,860 | 6/1996 | Pompei et al. . |
| 738,960 | 9/1903 | Vaughan et al. . |
| 1,363,259 | 12/1920 | Mills . |
| 2,696,117 | 12/1954 | Harrison . |
| 2,804,069 | 8/1957 | Schwamm et al. . |
| 2,844,031 | 7/1958 | Rosenthal . |
| 2,848,998 | 8/1958 | Bryan . |
| 2,877,500 | 3/1959 | Rainer et al. . |
| 2,904,480 | 9/1959 | Rainer et al. . |
| 2,969,141 | 1/1961 | Katzin . |
| 2,972,991 | 2/1961 | Burke . |
| 3,023,398 | 2/1962 | Siegert . |
| 3,054,397 | 9/1962 | Benzinger . |
| 3,156,117 | 11/1964 | Benzinger . |
| 3,179,805 | 4/1965 | Astheimer . |
| 3,190,436 | 6/1965 | Diamant . |
| 3,193,978 | 7/1965 | Bader . |
| 3,234,593 | 2/1966 | Lerner et al. . |
| 3,277,715 | 10/1966 | Vanderschmidt . |
| 3,282,106 | 11/1966 | Barnes . |
| 3,301,394 | 1/1967 | Baermann et al. . |
| 3,335,715 | 8/1967 | Hugenholtz et al. . |
| 3,349,896 | 10/1967 | Ensign et al. . |
| 3,367,186 | 2/1968 | Ensign et al. . |
| 3,368,076 | 2/1968 | Clifford . |
| 3,465,149 | 9/1969 | Flint . |
| 3,469,449 | 9/1969 | Keller . |
| 3,469,685 | 9/1969 | Baermann . |
| 3,491,596 | 1/1970 | Dean . |
| 3,500,280 | 3/1970 | Ensign . |
| 3,507,153 | 4/1970 | Jones et al. . |
| 3,526,135 | 9/1970 | Wortz . |
| 3,531,642 | 9/1970 | Barnes et al. . |
| 3,531,992 | 10/1970 | Moore . |
| 3,581,570 | 6/1971 | Wortz . |
| 3,605,750 | 9/1971 | Sheridan et al. . |
| 3,626,757 | 12/1971 | Benzinger . |
| 3,641,345 | 2/1972 | Coackley et al. . |
| 3,650,153 | 3/1972 | Schwab . |
| 3,653,263 | 4/1972 | Poole et al. . |
| 3,663,917 | 5/1972 | Mahmoodi . |
| 3,673,868 | 7/1972 | Beury, III et al. . |
| 3,678,751 | 7/1972 | Mead et al. . |
| 3,681,991 | 8/1972 | Eberly, Jr. . |
| 3,701,347 | 10/1972 | Belkin . |
| 3,703,892 | 11/1972 | Meyers . |
| 3,719,396 | 3/1973 | VanDeWalker et al. . |
| 3,724,448 | 4/1973 | Lima . |
| 3,729,998 | 5/1973 | Mueller et al. . |
| 3,735,864 | 5/1973 | Eckhart . |
| 3,738,172 | 6/1973 | Sato . |
| 3,738,173 | 6/1973 | Sato . |
| 3,738,479 | 6/1973 | Sato . |
| 3,738,892 | 6/1973 | Curcio . |
| 3,742,191 | 6/1973 | Poole et al. . |
| 3,750,471 | 8/1973 | Bremer . |
| 3,777,568 | 12/1973 | Risgin et al. . |
| 3,781,748 | 12/1973 | Bishop et al. . |
| 3,781,837 | 12/1973 | Anderson et al. . |
| 3,798,366 | 3/1974 | Hunt et al. . |
| 3,809,228 | 5/1974 | Fowler et al. . |
| 3,809,229 | 5/1974 | Wahlig . |
| 3,809,920 | 5/1974 | Cohen et al. . |
| 3,812,847 | 5/1974 | Moore et al. . |
| 3,812,897 | 5/1974 | Latinen . |
| 3,822,593 | 7/1974 | Oudewaal . |
| 3,822,598 | 7/1974 | Brothers et al. . |
| 3,832,669 | 8/1974 | Mueller et al. . |
| 3,833,115 | 9/1974 | Schapker . |
| 3,834,238 | 9/1974 | Mueller et al. . |
| 3,838,600 | 10/1974 | Ersek et al. . |
| 3,849,530 | 11/1974 | Wyeth et al. . |
| 3,851,029 | 11/1974 | Cornett, III et al. . |
| 3,878,836 | 4/1975 | Twentier . |
| 3,880,282 | 4/1975 | Naumann . |
| 3,929,018 | 12/1975 | Turner . |
| 3,942,891 | 3/1976 | Spielberger et al. . |
| 3,949,740 | 4/1976 | Twentier . |
| 3,987,899 | 10/1976 | Vyprachticky . |
| 3,999,434 | 12/1976 | Yen . |
| 3,999,537 | 12/1976 | Noiles . |
| 4,005,605 | 2/1977 | Michael . |
| 4,022,855 | 5/1977 | Hamblen . |
| 4,024,397 | 5/1977 | Weiner . |
| 4,054,057 | 10/1977 | Kluge . |
| 4,061,226 | 12/1977 | Essen . |
| 4,062,239 | 12/1977 | Fowler et al. . |
| 4,081,678 | 3/1978 | Macall . |
| 4,091,922 | 5/1978 | Egler . |
| 4,117,926 | 10/1978 | Turner et al. . |
| 4,148,304 | 4/1979 | Mull . |
| 4,159,766 | 7/1979 | Kluge . |
| 4,166,389 | 9/1979 | Montren . |
| 4,166,454 | 9/1979 | Meijer . |
| 4,168,626 | 9/1979 | Fullager . |
| 4,183,248 | 1/1980 | West . |
| 4,191,197 | 3/1980 | Benzinger . |
| 4,193,396 | 3/1980 | Wacker . |
| 4,197,944 | 4/1980 | Catlin . |
| 4,201,222 | 5/1980 | Haase . |
| 4,226,910 | 10/1980 | Dahlen et al. . |
| 4,233,512 | 11/1980 | Rupert . |
| 4,241,828 | 12/1980 | Bourdelle et al. . |
| 4,271,358 | 6/1981 | Schwarz . |
| 4,275,591 | 6/1981 | Wand . |
| 4,297,685 | 10/1981 | Brainard, II . |
| 4,301,682 | 11/1981 | Everest . |
| 4,312,357 | 1/1982 | Andersson et al. . |
| 4,315,150 | 2/1982 | Darringer et al. . |
| 4,341,992 | 7/1982 | Goldstein . |
| 4,343,182 | 8/1982 | Pompei . |
| 4,343,185 | 8/1982 | Knute . |
| 4,350,166 | 9/1982 | Mobarry . |
| 4,351,616 | 9/1982 | Farnstrom et al. . |
| 4,362,166 | 12/1982 | Furler et al. . |
| 4,372,690 | 2/1983 | Berman et al. . |
| 4,378,489 | 3/1983 | Chadinsky et al. . |
| 4,379,971 | 4/1983 | Smith et al. . |
| 4,380,998 | 4/1983 | Kieffer, III et al. . |
| 4,392,005 | 7/1983 | Mohrman . |
| 4,400,341 | 8/1983 | Sorensen . |
| 4,414,980 | 11/1983 | Mott . |
| 4,420,265 | 12/1983 | Everest et al. . |
| 4,425,921 | 1/1984 | Fujisaki et al. . |
| 4,433,924 | 2/1984 | Quinn, III . |
| 4,436,438 | 3/1984 | Voznick . |
| 4,454,370 | 6/1984 | Viznick . |
| 4,456,390 | 6/1984 | Junkert et al. . |
| 4,457,633 | 7/1984 | Andrews . |
| 4,471,354 | 9/1984 | Smith . |
| 4,475,554 | 10/1984 | Hyndman . |
| 4,481,417 | 11/1984 | Inglee . |
| 4,487,208 | 12/1984 | Kamens . |

| Patent No. | Date | Name |
|---|---|---|
| 4,493,564 | 1/1985 | Epstein . |
| 4,494,881 | 1/1985 | Everest . |
| 4,509,522 | 4/1985 | Manuccia et al. . |
| 4,510,115 | 4/1985 | Gokcen et al. . |
| 4,515,165 | 5/1985 | Carroll . |
| 4,524,779 | 6/1985 | Brown, Jr. . |
| 4,527,896 | 7/1985 | Irani et al. . |
| 4,537,791 | 8/1985 | Tarjan . |
| 4,566,808 | 1/1986 | Pompei et al. . |
| 4,572,365 | 2/1986 | Bruno et al. . |
| 4,588,306 | 5/1986 | Burger et al. . |
| 4,602,642 | 7/1986 | O'Hara et al. . |
| 4,607,963 | 8/1986 | Ulrickson . |
| 4,614,442 | 9/1986 | Poncy . |
| 4,619,271 | 10/1986 | Burger et al. . |
| 4,626,686 | 12/1986 | Pompei et al. . |
| 4,634,294 | 1/1987 | Christol et al. . |
| 4,636,091 | 1/1987 | Pompei et al. . |
| 4,644,163 | 2/1987 | Selander . |
| 4,652,145 | 3/1987 | Bjornberg . |
| 4,659,234 | 4/1987 | Brouwer . |
| 4,662,360 | 5/1987 | O'Hara et al. . |
| 4,679,949 | 7/1987 | Sakamoto . |
| 4,684,018 | 8/1987 | Jarund . |
| 4,691,712 | 9/1987 | Brown, Jr. . |
| 4,727,500 | 2/1988 | Jackson et al. . |
| 4,763,522 | 8/1988 | Pompei . |
| 4,765,752 | 8/1988 | Beynon et al. . |
| 4,784,149 | 11/1988 | Berman et al. . |
| 4,790,324 | 12/1988 | O'Hara et al. . |
| 4,797,840 | 1/1989 | Fraden . |
| 4,801,212 | 1/1989 | Imura . |
| 4,823,949 | 4/1989 | Bala . |
| 4,831,258 | 5/1989 | Paulk et al. . |
| 4,854,730 | 8/1989 | Fraden . |
| 4,859,079 | 8/1989 | Wickersheim et al. . |
| 4,863,281 | 9/1989 | Suszynski . |
| 4,874,253 | 10/1989 | Pompei et al. . |
| 4,895,164 | 1/1990 | Wood . |
| 4,900,162 | 2/1990 | Beckman et al. . |
| 4,907,895 | 3/1990 | Everest . |
| 4,911,559 | 3/1990 | Meyst et al. . |
| 4,914,673 | 4/1990 | Imura . |
| 4,919,505 | 4/1990 | Bartosiak et al. . |
| 4,932,789 | 6/1990 | Egawa et al. . |
| 4,955,980 | 9/1990 | Masuo . |
| 4,986,672 | 1/1991 | Beynon . |
| 4,993,419 | 2/1991 | Pompei et al. . |
| 4,993,424 | 2/1991 | Suszysnki et al. . |
| 5,001,657 | 3/1991 | Yagura et al. . |
| 5,011,296 | 4/1991 | Bartosiak et al. . |
| 5,012,813 | 5/1991 | Pompei et al. . |
| 5,017,018 | 5/1991 | Iuchi et al. . |
| 5,017,019 | 5/1991 | Pompei . |
| 5,018,872 | 5/1991 | Suszynski et al. . |
| 5,024,533 | 6/1991 | Egawa et al. . |
| 5,031,619 | 7/1991 | Pompei . |
| 5,046,482 | 9/1991 | Everest . |
| 5,051,590 | 9/1991 | Kern et al. . |
| 5,051,595 | 9/1991 | Kern et al. . |
| 5,054,936 | 10/1991 | Fraden . |
| 5,056,682 | 10/1991 | Meyst et al. . |
| 5,066,142 | 11/1991 | DeFrank et al. . |
| 5,081,359 | 1/1992 | Pompei . |
| 5,081,998 | 1/1992 | Yelderman et al. . |
| 5,088,834 | 2/1992 | Howe et al. . |
| 5,094,544 | 3/1992 | Ignatowicz . |
| 5,127,742 | 7/1992 | Fraden . |
| 5,150,969 | 9/1992 | Goldberg et al. . |
| 5,153,563 | 10/1992 | Goto et al. . |
| 5,159,936 | 11/1992 | Yelderman et al. . |
| 5,163,418 | 11/1992 | Fraden et al. . |
| 5,167,235 | 12/1992 | Seacord et al. . |
| 5,169,235 | 12/1992 | Tominaga et al. . |
| 5,172,978 | 12/1992 | Nomura et al. . |
| 5,178,464 | 1/1993 | Fraden . |
| 5,179,936 | 1/1993 | O'Hara et al. . |
| 5,183,337 | 2/1993 | Pompei . |
| 5,188,459 | 2/1993 | Mino et al. . |
| 5,199,436 | 4/1993 | Pompei et al. . |
| 5,229,612 | 7/1993 | Pompei et al. . |
| 5,232,284 | 8/1993 | Egawa et al. . |
| 5,264,375 | 11/1993 | Bang et al. . |
| 5,271,407 | 12/1993 | Pompei et al. . |
| 5,292,347 | 3/1994 | Pompei . |
| 5,293,862 | 3/1994 | O'Hara et al. . |
| 5,293,877 | 3/1994 | O'Hara et al. . |
| 5,313,951 | 5/1994 | Zhao . |
| 5,319,202 | 6/1994 | Pompei . |
| 5,325,863 | 7/1994 | Pompei . |
| 5,333,784 | 8/1994 | Pompei . |
| 5,340,215 | 8/1994 | Makita et al. . |
| 5,352,038 | 10/1994 | Schmidt et al. . |
| 5,352,039 | 10/1994 | Barrel et al. . |
| 5,358,333 | 10/1994 | Schmidt et al. . |
| 5,368,038 | 11/1994 | Fraden . |
| 5,381,796 | 1/1995 | Pompei . |
| 5,388,907 | 2/1995 | Aoyama et al. . |
| 5,391,001 | 2/1995 | Rupert et al. . |
| 5,404,125 | 4/1995 | Mori et al. . |
| 5,411,032 | 5/1995 | Esseff et al. . |
| 5,445,158 | 8/1995 | Pompei . |
| 5,458,121 | 10/1995 | Harada . |
| 5,469,855 | 11/1995 | Pompei et al. . |
| 5,479,931 | 1/1996 | Mooradian . |
| 5,487,607 | 1/1996 | Makita et al. . |
| 5,515,847 | 5/1996 | Braig et al. . |
| 5,516,010 | 5/1996 | O'Hara et al. . |
| 5,522,662 | 6/1996 | Shiokawa . |
| 5,528,041 | 6/1996 | Pompei . |
| 5,609,564 | 3/1997 | Makita et al. . |
| 5,645,350 | 7/1997 | Tang . |

FOREIGN PATENT DOCUMENTS

| | | |
|---|---|---|
| 0098402 | 1/1984 | European Pat. Off. . |
| 0445783A2 | 9/1991 | European Pat. Off. . |
| 0674162A2 | 9/1995 | European Pat. Off. . |
| 0715359A1 | 6/1996 | European Pat. Off. . |
| 2167973 | 8/1973 | France . |
| 2343234 | 9/1977 | France . |
| 4422974A1 | 1/1995 | Germany . |
| 19604201A1 | 8/1997 | Germany . |
| 55-154426 | 12/1980 | Japan . |
| 56-161134 | 12/1981 | Japan . |
| 56-167428 | 12/1981 | Japan . |
| 57-35739 | 2/1982 | Japan . |
| 57-35740 | 2/1982 | Japan . |
| 57-35741 | 2/1982 | Japan . |
| 57-212039 | 12/1982 | Japan . |
| 59-135439 | 9/1984 | Japan . |
| 60-187829 | 9/1985 | Japan . |
| 100319 | 6/1987 | Japan . |
| 147818 | 11/1962 | U.S.S.R. . |
| 1425765 | 2/1976 | United Kingdom . |
| 1518521 | 7/1978 | United Kingdom . |
| WO93/03666 | 3/1993 | WIPO . |
| WO93/19662 | 10/1993 | WIPO . |
| WO95/14913 | 6/1995 | WIPO . |
| WO95/18961 | 7/1995 | WIPO . |
| WO96/07877 | 3/1996 | WIPO . |
| WO 96/19938 | 7/1996 | WIPO . |

OTHER PUBLICATIONS

J. Fraden, "Application of Piezo/Pyroelectric Films in Medical Transducers," *Journal of Chemical Engineering*, vol. 13, No. 3, Mar./Apr. 1988, pp. 133–138.

J.M. Looney, Jr. et al., "Ear Thermometry," *Medical Electronics*, Jun. 1989.

M. Benzinger et al., "Tympanic Clinical Temperature,"presented at the Fifth Symposium on Temperature, Washington, D.C., Jun. 21–24, 1971, sponsored by the National Bureau of Standards, American Institute of Physics, and Instrument Society of America.

Information Sheet, Model 1M, Thermopile Detector, Dexter Research Center, 2 pages, Oct. 1980, Michigan.

Information Sheet, Model 2M, Thermopile Detector, Dexter Research Center, 2 pages, Oct. 1980, Michigan.

Information Sheet, Model M5, Thermopile Detector, Dexter Research Center, 2 pages, Oct. 1980, Michigan.

Information Sheet, Model DR26, Dual Element Thermopile Detector, Dexter Research Center, 3 pages, Oct. 1980, Michigan.

Information Sheet, Model DR46, Thermopile Detector, Dexter Research Center, 1 page, Oct. 1979, Michigan.

Information Sheet, Model 1010, Low Noise Amplifier, Dexter Research Center, 2 pages, Oct. 1980, Michigan.

Dexter Research Center, Inc., Product Price List—Domestic, Jan. 1, 1983.

Y. Houdas, et al., "Human Body Temperature, Its Measurement and Regulation," p. 83, Plemum Press, New York and London.

Advertisement, "Optical Calibration," Det Tronics, Sunnyvale, CA, *In Tech*, p. 48, Oct. 1987.

P. Gaudet, "Omega Tympanic Infrared Temperature Measuring Instrument, Product Specification," Exergen Corporation, pp. 1–3.

ASTM Designation: E 1112–86 (Reapproved 1991), "Standard Specification for Electronic Thermometer for Intermittent Determination of Patient Temperature," pp. 1–4 (Reprinted from the Annual Book of ASTM Standards, Philadelphia, PA).

"Electronic Thermometers," *Medical Electronics*, Jun. 1996, pp. 118–120.

Schieferdecker, J., et al., "Infrared thermopile sensors with high sensitivity and very low temperature coefficient," *Sensors and Actuators* A 46–47 (1995) 422–427 (printed in the Netherlands).

P.C. Lanchester, "Digital thermometer circuit for silicon diode sensors," *CRYOGENICS* 1989 vol. 29, Dec. Southampton, UK, pp. 1156–1159.

Trial Exhibit list from Thermoscan, Inc. V. Sherwood Medical Co.

Standard Specification for Infrared Thermometers for Intermittent Determination of Patient Temperature, ASTM Designation: EXXXX–97 (May 9, 1997).

| BLK BDY TEMP DEGREES F | CJ DEGREES F | CJ-BIT COUNT | THERMOPILE BIT COUNT |
|---|---|---|---|
| ⋮ | ⋮ | ⋮ | ⋮ |
| 101.7 | 65.3 | 21486 | 8939 |
| 101.7 | 65.4 | 21471 | 9102 |
| 101.7 | 65.5 | 21454 | 9237 |
| 101.7 | 65.6 | 21440 | 9363 |
| 101.7 | 65.7 | 21424 | 9499 |
| 101.7 | 65.8 | 21410 | 9649 |
| 101.7 | 65.9 | 21395 | 9755 |
| 101.7 | 66.0 | 21380 | 9889 |
| 101.7 | 66.1 | 21365 | 9995 |
| 101.7 | 66.2 | 21350 | 10106 |
| 101.7 | 66.3 | 21335 | 10230 |
| 101.7 | 66.4 | 21318 | 10340 |
| 101.7 | 66.5 | 21304 | 10462 |
| 101.7 | 66.6 | 21289 | 10575 |
| 101.7 | 66.7 | 21273 | 10675 |
| 101.7 | 66.8 | 21258 | 10773 |
| 101.7 | 66.9 | 21244 | 10866 |
| 101.7 | 67.0 | 21229 | 10967 |
| 101.7 | 67.1 | 21213 | 11083 |
| 101.8 | 67.2 | 21198 | 11183 |
| 101.8 | 67.3 | 21182 | 11314 |
| 101.8 | 67.4 | 21167 | 11424 |
| 101.8 | 67.5 | 21153 | 11535 |
| 101.8 | 67.6 | 21137 | 11641 |
| 101.8 | 67.7 | 21123 | 11730 |
| 101.8 | 67.8 | 21107 | 11875 |
| 101.8 | 67.9 | 21092 | 11998 |
| 101.8 | 68.0 | 21076 | 12089 |
| 101.8 | 68.1 | 21062 | 12201 |
| 101.8 | 68.2 | 21047 | 12326 |
| 101.9 | 68.3 | 21031 | 12426 |
| 101.8 | 68.4 | 21016 | 12559 |
| 101.9 | 68.5 | 21002 | 12666 |
| 101.9 | 68.6 | 20986 | 12769 |
| 101.9 | 68.7 | 20970 | 12889 |
| 101.9 | 68.8 | 20956 | 13007 |
| 101.9 | 68.9 | 20941 | 13119 |
| 101.9 | 69.0 | 20926 | 13240 |
| 101.9 | 69.1 | 20910 | 13369 |
| ⋮ | ⋮ | ⋮ | ⋮ |

FIG. 5

| CJ DEG | Black Body Temperature (degrees F) | | | | | | | | | |
|---|---|---|---|---|---|---|---|---|---|---|
| | 101.0 | 101.1 | 101.2 | 101.3 | 101.4 | 101.5 | 101.6 | 101.7 | 101.8 | 101.9 |
| ⋮ | ⋮ | ⋮ | ⋮ | ⋮ | ⋮ | ⋮ | ⋮ | ⋮ | ⋮ | ⋮ |
| 65.3 | | DATA | | | | | | DATA | | |
| 65.4 | | DATA | | | | | | DATA | | |
| 65.5 | | DATA | | | | | | DATA | | |
| 65.6 | | DATA | | | | | | DATA | | |
| 65.7 | | DATA | | | | | | DATA | | |
| 65.8 | | DATA | | | | | | DATA | | |
| 65.9 | | DATA | | | | | | DATA | | |
| 66.0 | | DATA | | | | | | DATA | | |
| 66.1 | | DATA | | | | | | DATA | | |
| 66.2 | | DATA | | | | | | DATA | | |
| 66.3 | | DATA | | | | | | DATA | | |
| 66.4 | | DATA | | | | | | DATA | | |
| 66.5 | | DATA | | | | | | DATA | | |
| 66.6 | | DATA | | | | | | DATA | | |
| 66.7 | | DATA | | | | | | DATA | | |
| 66.8 | | | DATA | | | | | DATA | | |
| 66.9 | | | DATA | | | | | DATA | | |
| 67.0 | | | DATA | | | | | DATA | | |
| 67.1 | | | DATA | | | | | DATA | | |
| 67.2 | | | DATA | | | | | | DATA | |
| 67.3 | | | DATA | | | | | | DATA | |
| 67.4 | | | DATA | | | | | | DATA | |
| 67.5 | | | DATA | | | | | | DATA | |
| 67.6 | | | DATA | | | | | | DATA | |
| 67.7 | | | DATA | | | | | | DATA | |
| 67.8 | | | DATA | | | | | | DATA | |
| 67.9 | | | DATA | | | | | | DATA | |
| 68.0 | | | DATA | | | | | | DATA | |
| 68.1 | | | DATA | | | | | | DATA | |
| 68.2 | | | | DATA | | | | | DATA | |
| 68.3 | | | | DATA | | | | | DATA | |
| 68.4 | | | | DATA | | | | | DATA | |
| 68.5 | | | | DATA | | | | | | DATA |
| 68.6 | | | | DATA | | | | | | DATA |
| 68.7 | | | | DATA | | | | | | DATA |
| 68.8 | | | | DATA | | | | | | DATA |
| 68.9 | | | | DATA | | | | | | DATA |
| 69.0 | | | | DATA | | | | | | DATA |
| 69.1 | | | | DATA | | | | | | DATA |
| ⋮ | ⋮ | ⋮ | ⋮ | ⋮ | ⋮ | ⋮ | ⋮ | ⋮ | ⋮ | ⋮ |

FIG. 6A

| CJ DEG | Black Body Temperature (degrees F) | | | | | | | | | |
|---|---|---|---|---|---|---|---|---|---|---|
| | 101.0 | 101.1 | 101.2 | 101.3 | 101.4 | 101.5 | 101.6 | 101.7 | 101.8 | 101.9 |
| ~ | ~ | ~ | ~ | ~ | ~ | ~ | ~ | ~ | ~ | ~ |
| 65.3 | DATA | DATA | DATA | DATA | DATA | DATA | DATA | DATA | DATA | DATA |
| 65.4 | DATA | DATA | DATA | DATA | DATA | DATA | DATA | DATA | DATA | DATA |
| 65.5 | DATA | DATA | DATA | DATA | DATA | DATA | DATA | DATA | DATA | DATA |
| 65.6 | DATA | DATA | DATA | DATA | DATA | DATA | DATA | DATA | DATA | DATA |
| 65.7 | DATA | DATA | DATA | DATA | DATA | DATA | DATA | DATA | DATA | DATA |
| 65.8 | DATA | DATA | DATA | DATA | DATA | DATA | DATA | DATA | DATA | DATA |
| 65.9 | DATA | DATA | DATA | DATA | DATA | DATA | DATA | DATA | DATA | DATA |
| 66.0 | DATA | DATA | DATA | DATA | DATA | DATA | DATA | DATA | DATA | DATA |
| 66.1 | DATA | DATA | DATA | DATA | DATA | DATA | DATA | DATA | DATA | DATA |
| 66.2 | DATA | DATA | DATA | DATA | DATA | DATA | DATA | DATA | DATA | DATA |
| 66.3 | DATA | DATA | DATA | DATA | DATA | DATA | DATA | DATA | DATA | DATA |
| 66.4 | DATA | DATA | DATA | DATA | DATA | DATA | DATA | DATA | DATA | DATA |
| 66.5 | DATA | DATA | DATA | DATA | DATA | DATA | DATA | DATA | DATA | DATA |
| 66.6 | DATA | DATA | DATA | DATA | DATA | DATA | DATA | DATA | DATA | DATA |
| 66.7 | DATA | DATA | DATA | DATA | DATA | DATA | DATA | DATA | DATA | DATA |
| 66.8 | DATA | DATA | DATA | DATA | DATA | DATA | DATA | DATA | DATA | DATA |
| 66.9 | DATA | DATA | DATA | DATA | DATA | DATA | DATA | DATA | DATA | DATA |
| 67.0 | DATA | DATA | DATA | DATA | DATA | DATA | DATA | DATA | DATA | DATA |
| 67.1 | DATA | DATA | DATA | DATA | DATA | DATA | DATA | DATA | DATA | DATA |
| 67.2 | DATA | DATA | DATA | DATA | DATA | DATA | DATA | DATA | DATA | DATA |
| 67.3 | DATA | DATA | DATA | DATA | DATA | DATA | DATA | DATA | DATA | DATA |
| 67.4 | DATA | DATA | DATA | DATA | DATA | DATA | DATA | DATA | DATA | DATA |
| 67.5 | DATA | DATA | DATA | DATA | DATA | DATA | DATA | DATA | DATA | DATA |
| 67.6 | DATA | DATA | DATA | DATA | DATA | DATA | DATA | DATA | DATA | DATA |
| 67.7 | DATA | DATA | DATA | DATA | DATA | DATA | DATA | DATA | DATA | DATA |
| 67.8 | DATA | DATA | DATA | DATA | DATA | DATA | DATA | DATA | DATA | DATA |
| 67.9 | DATA | DATA | DATA | DATA | DATA | DATA | DATA | DATA | DATA | DATA |
| 68.0 | DATA | DATA | DATA | DATA | DATA | DATA | DATA | DATA | DATA | DATA |
| 68.1 | DATA | DATA | DATA | DATA | DATA | DATA | DATA | DATA | DATA | DATA |
| 68.2 | DATA | DATA | DATA | DATA | DATA | DATA | DATA | DATA | DATA | DATA |
| 68.3 | DATA | DATA | DATA | DATA | DATA | DATA | DATA | DATA | DATA | DATA |
| 68.4 | DATA | DATA | DATA | DATA | DATA | DATA | DATA | DATA | DATA | DATA |
| 68.5 | DATA | DATA | DATA | DATA | DATA | DATA | DATA | DATA | DATA | DATA |
| 68.6 | DATA | DATA | DATA | DATA | DATA | DATA | DATA | DATA | DATA | DATA |
| 68.7 | DATA | DATA | DATA | DATA | DATA | DATA | DATA | DATA | DATA | DATA |
| 68.8 | DATA | DATA | DATA | DATA | DATA | DATA | DATA | DATA | DATA | DATA |
| 68.9 | DATA | DATA | DATA | DATA | DATA | DATA | DATA | DATA | DATA | DATA |
| 69.0 | DATA | DATA | DATA | DATA | DATA | DATA | DATA | DATA | DATA | DATA |
| 69.1 | DATA | DATA | DATA | DATA | DATA | DATA | DATA | DATA | DATA | DATA |
| ⋮ | ⋮ | ⋮ | ⋮ | ⋮ | ⋮ | ⋮ | ⋮ | ⋮ | ⋮ | ⋮ |

FIG. 6B

| Starting Look-up Table Address: | FF00H | | | | | | | | | | |
|---|---|---|---|---|---|---|---|---|---|---|---|
| CJ Degrees F | | 66.0 | 66.1 | 66.2 | 66.3 | 66.4 | 66.5 | 66.6 | 66.7 | 66.8 | 66.9 | 67.0 |
| CJ Bit Count | | 21380 | 21365 | 21350 | 21335 | 21318 | 21304 | 21289 | 21273 | 21258 | 21244 | 21229 |
| Goto EPROM Address | | 0000H | 0010H | 0020H | 0030H | 0040H | 0050H | 0060H | 0070H | 0080H | 0090H | 00A0H |

| Low Byte Address | Black Body Temp deg. F | |
|---|---|---|
| 00 | 21380 | 66.0 |
| 01 | 21365 | 66.1 |
| 02 | 21350 | 66.2 |
| 03 | 21335 | 66.3 |
| 04 | 21318 | 66.4 |
| 05 | 21304 | 66.5 |
| 06 | 21289 | 66.6 |
| 07 | 21273 | 66.7 |
| 08 | 21258 | 66.8 |
| 09 | 21244 | 66.9 |
| 0A | 21229 | 67.0 |

| | 00H | 01H | 02H | 03H | 04H | 05H | 06H | 07H | 08H | 09H | 0AH |
|---|---|---|---|---|---|---|---|---|---|---|---|
| | 99.0 | 99.1 | 99.2 | 99.3 | 99.4 | 99.5 | 99.6 | 99.7 | 99.8 | 99.9 | 100.0 |
| | | DATA | | | | | | | | | |
| | | DATA | | | | | | | | | |
| | | DATA | | | | | | | | | |
| | | DATA | | | | | | | | | |
| | | DATA | | | | | | DATA | | | |
| | | DATA | | | | | | DATA | | | |
| | | DATA | | | | | | DATA | | | |
| | | | DATA | | | | | DATA | | | |
| | | | DATA | | | | | | DATA | | |
| | | | DATA | | | | | | DATA | | |
| | | | DATA | | | | | | DATA | | |

FIG. 8B

| Low Byte Address | | 00H | 01H | 02H | 03H | 04H | 05H | 06H | 07H | 08H | 09H | 0AH |
|---|---|---|---|---|---|---|---|---|---|---|---|---|
| Black Body Temp deg. F | | 99.0 | 99.1 | 99.2 | 99.3 | 99.4 | 99.5 | 99.6 | 99.7 | 99.8 | 99.9 | 100.0 |
| 00 | 21380 | DATA | DATA | DATA | DATA | DATA | DATA | DATA | DATA | DATA | DATA | DATA |
| 01 | 21365 | DATA | DATA | DATA | DATA | DATA | DATA | DATA | DATA | DATA | DATA | DATA |
| 02 | 21350 | DATA | DATA | DATA | DATA | DATA | DATA | DATA | DATA | DATA | DATA | DATA |
| 03 | 21335 | DATA | DATA | DATA | DATA | DATA | DATA | DATA | DATA | DATA | DATA | DATA |
| 04 | 21318 | DATA | DATA | DATA | DATA | DATA | DATA | DATA | DATA | DATA | DATA | DATA |
| 05 | 21304 | DATA | DATA | DATA | DATA | DATA | DATA | DATA | DATA | DATA | DATA | DATA |
| 06 | 21289 | DATA | DATA | DATA | DATA | DATA | DATA | DATA | DATA | DATA | DATA | DATA |
| 07 | 21273 | DATA | DATA | DATA | DATA | DATA | DATA | DATA | DATA | DATA | DATA | DATA |
| 08 | 21258 | DATA | DATA | DATA | DATA | DATA | DATA | DATA | DATA | DATA | DATA | DATA |
| 09 | 21244 | DATA | DATA | DATA | DATA | DATA | DATA | DATA | DATA | DATA | DATA | DATA |
| 0A | 21229 | DATA | DATA | DATA | DATA | DATA | DATA | DATA | DATA | DATA | DATA | DATA |

RADIOMETRIC TEMPERATURE MEASUREMENT BASED ON EMPIRICAL MEASUREMENTS AND LINEAR FUNCTIONS

CROSS-REFERENCE TO RELATED APPLICATIONS

This patent application is related to concurrently filed, commonly-assigned application Ser. No. 09/089417, now allowed of Canfield et al entitled "Tympanic Thermometer With Modular Sensing Probe" (attorney docket no. 2204-15), the entire disclosure of which (including the drawings) is incorporated herein by reference as if expressly set forth.

FIELD OF THE INVENTION

This invention relates to the field of radiometric temperature measurement, and more particularly to non-contacting electronic instruments for intermittently measuring patient temperatures by detecting the intensity of thermal radiation. Still more particularly, the present invention relates to a method and apparatus for developing an empirical data set for use in measuring, with a high degree of accuracy, a person's temperature based on sensed infrared radiation emitted by the person's tympanic membrane (ear drum) and/or surrounding outer ear canal tissue.

BACKGROUND AND SUMMARY OF THE INVENTION

Temperature Taking is Important

Doctors, nurses, parents, and other care providers need to rapidly and accurately measure a person's body temperature. To find out whether a person is sick, the first thing a care provider usually does is take the person's temperature. Someone running a fever is likely to have an infection. A doctor or nurse can tell a lot about how a patient is doing by monitoring the patient's temperature over time and noting how it has changed.

Ear Thermometers Work by Taking the Temperature of Your Eardrum

Doctors and nurses can now measure temperature through the ear. Ear thermometers measure your temperature by detecting the amount of radiant heat ("infrared energy") emitted by your eardrum. Just as you can feel the heat when you hold your hands up in front of a warm fire, an ear thermometer can detect eardrum temperature without having to actually touch the eardrum. Because the eardrum is close to the body's master temperature control mechanism (the hypothalamus portion of the brain), measuring eardrum temperature is a non-invasive way to ascertain the patient's core body temperature.

Ear Thermometers Have Advantages Over Other Types of Thermometers

Ear thermometers are easy and quick to use. To use an ear thermometer, a nurse or other care provider places a disposable probe cover over the ear thermometer's heat sensing probe. The probe cover keeps the sensing probe clean and prevents the spread of disease from one patient to another. Once the disposable probe cover is in place, the nurse or other caregiver inserts the covered sensing probe into the patient's outer ear. Typically, a button is then pressed to command the instrument to make a measurement. The patient's temperature nearly instantly shows on the instrument's display.

Ear thermometry thus offers significant advantages over other types of thermometry in many clinical contexts. For example:

The measuring time is very rapid—usually less than two seconds.

The eardrum is at or near the body's core temperature—providing the most accurate location for non-invasive temperature measurement.

Because the ear is a dry orifice, cross-contamination is not much of an issue—and individual, disposable probe covers further reduce the already low cross-contamination risks.

Because of the short measurement time and the use of either ear as the measuring point, it is possible to rapidly measure the temperature of children, invalids and sleeping patients—and in other situations where it is difficult to get a patient to sit still for thirty seconds with a probe under their tongue.

The theoretical accuracy of the measurement is very high (for example, on the order of one tenth of one degree).

Accuracy is a Big Concern

Despite these many clear advantages, ear thermometry has not yet achieved wide success in the medical marketplace. The main reason is that even though the theoretical accuracy of ear thermometers is very high, this potential has not been realized in practice. Despite many years of hard work on the part of the major thermometer manufacturers, existing ear thermometers do not provide the high, repeatable accuracy required in a demanding hospital environment.

This failing of existing ear thermometers is widely known. Everyone agrees that the ultimate technical goal of an ear thermometer is to accurately assess the temperature of the patient's eardrum. But using existing ear thermometers, hospital nurses are often unable to duplicate successive readings. If you try to measure the same person's temperature twice with existing commercial ear thermometers, you may get two very different readings. Since accurate, repeatable temperature measurements are often critical to proper medical diagnosis and treatment (for example, to detect a 101.5° F. hospital fever threshold or to establish a temperature pattern over time), it is crucial for temperature measurements to be as accurate and repeatable as possible.

Unfortunately, the reading given by an ear thermometer can depend on a variety of factors other than the patient's eardrum temperature. Some of these factors cannot be easily controlled, and some of them vary with operating conditions (and thus potentially from one temperature to the next).

The draft proposed "Standard Specification for Infrared Thermometers For Intermittent Determination of Patient Temperature" (American Society For Testing and Materials, EXXXX-97, May 9, 1997) notes that a signal detected by a tympanic thermometer's heat sensor depends not only on its own and the patient's true temperatures, but also on the size and shape of the probe; its field of view; ambient temperature; and operator technique. The Standard Specification sets forth a process for determining the "laboratory error" of an instrument—i.e., how much the instrument's internal noise, drifts, manufacturing tolerances, and other uncertainties in temperature measurement, affect how close the instrument's measured temperature is to actual temperature under various ambient temperature and humidity conditions.

The draft Standards Specification requires ear thermometers to exhibit, during lab testing with infrared radiation reference sources, an accuracy of 0.4° F. (Fahrenheit) for a test temperature range of 96.8° F. to 102.2° F. over an ambient (air) temperature range of 60.8° F. to 104° F.; and a lab testing accuracy of 0.5° F. over the remainder of a wider (94° F. to 108° F.) measurement range. Because of the reasons discussed above, many commercially available ear thermometers just barely meet this standard—even though an ear thermometer's theoretical accuracy is much higher and even though some health professionals consider a 0.4° F. error to be excessive in certain critical care and other clinical settings.

A range of previously intractable technical issues have stood in the way of electronic ear thermometry achieving better accuracy. Some background about the way ear thermometers work is necessary for an appreciation of the accuracy problem.

Technical Discussion of How Ear Thermometers Work

As mentioned above, an ear thermometer works by sensing the net infrared (heat) flux between an ear thermometer heat sensor and the person's eardrum. Because the medical name for the eardrum is "tympanic membrane," ear thermometers are sometimes also called "tympanic thermometers." If the sensor's own temperature and other characteristics are accurately know, the sensed infrared flux can be used to precisely determine the temperature of the tympanic membrane and/or surrounding ear canal tissue.

A non-contact infrared thermometer generally includes the various components shown in prior art FIG. 1. An infrared sensor 10 measures the net thermal radiation flux ($\Phi_b$) between the instrument and the subject's eardrum 11 and/or outer ear canal 13 and produces a signal $S_{\Phi b}$ representing this net thermal radiation flux. A reference contact sensor 12 thermally coupled (15) to sensor 10 measures the surface temperature ($T_s$) of the infrared sensor 10 and produces a signal $S_{Ts}$ representing this surface temperature. An optical component 14 (often called a "waveguide") defines a field of view for sensor 10 and a corresponding optical coefficient (A) that describes how much of the heat emitted by a certain surface area of the eardrum reaches the infrared sensor 10. A computer or other computation means 16 determines the subject's temperature $T_b$ based on inputs from sensors 10 and 12. A display 18 displays the subject's temperature. A disposable probe cover 20 is used to prevent cross-contamination between patients.

Some Ear Thermometers Calculate Temperature Using a Mathematical Equation Describing a Law of Physics The particular mathematical relationship that physicists use to describe the underlying operation of an ear thermometer is called the Stefan-Boltzmann equation. This equation, set forth below, is complex:

$$T_b = \sqrt[4]{T_S^4 + \frac{\Phi_b}{A\sigma\varepsilon_b\varepsilon_s}}$$

In this equation:

A is the optical coefficient (determined by waveguide 14),

σ is the Stefan-Boltzmann constant, $\varepsilon_b$ is the emissivity of the subject, $\varepsilon_s$ is the emissivity of the infrared sensor 10, $T_s$ is the surface temperature of infrared sensor 10 (measured by temperature sensor 12), $\Phi_b$ is the net infrared flux between infrared sensor 10 and the subject (as measured by infrared sensor 10), and $T_b$ represents the calculated target temperature.

One way to determine patient temperature is for the computer 16 of FIG. 1 to calculate the Stefan-Boltzmann equation. Computer 16 can readily calculate this equation using floating-point arithmetic. However, to achieve accuracy, the calculation requires an accurate detection of two independent variables: the surface temperature Ts of the sensor 10, and the net infrared flux $\Phi$b between the sensor 10 and the subject—plus accurate knowledge of the remaining equation parameters including optical coefficient A and emissivity $\varepsilon_s$. The problem is that various factors affecting these parameters are not constant across ambient and patient temperature ranges, can and typically do change from one instrument to the next, and can fluctuate based on a wide variety of environmental affects including component aging, ambient temperature and how long the thermometer has been placed in the ear. The practical accuracy of a thermometer that calculates temperature based on the Stefan-Boltzmann calculation suffers because of these various effects.

One approach to solving the accuracy problem is to correct the result of the Stefan-Boltzmann equation by using a correction factor(s) that attempts to take these various factors into account. See for example, U.S. Pat. No. 5,199,436 to Pompeii et al., which corrects the Stefan-Boltzmann calculation based on a gain calibration factor that is in part empirically determined; and U.S. Pat. No. 5,017,018 to Iuchi et al., which applies an error correction factor based on room temperature.

These approaches improve accuracy but have the limitation that they are complex and cannot practically take into account all of the factors that can influence measurement accuracy. As recognized in U.S. Pat. No. 5,293,877 to O'Hara:

The relationships between all the inputs and the target temperature over a range of ambient temperatures are too complex to specify. Experiments have demonstrated that sufficient accuracy is not achievable by utilizing sensors to sense the temperature of the thermopile and waveguide and then processing the signals according to equations which subtract an amount from the measued temperature of the target which is attributable to temperature variations in the waveguide.

Another Approach Models the Thermometer Using a Non-Linear Mathematical System

Another approach does not use the Stefan-Boltzmann equation, but instead defines a non-linear system model based on a complex, non-linear polynomial algorithm using an equation whose coefficients are analytically developed by multivariate linear regression analysis of data derived through calibration procedures. The O'Hara '877 patent uses this approach. O'Hara et al. make use of a technique they refer to as "calibration mapping" that they say they borrowed from the field of "complex systems modeling." O'Hara et al's "calibration mapping" involves the collection of the magnitudes of the inputs over a suitable range of target temperatures and over a suitable range of environmental (room) temperatures to describe a non-linear system with sufficient accuracy. O'Hara et al. say this is accomplished using multi-variate linear regression or other "curve fitting" (i.e., non-linear) analytical techniques.

The particular example O'Hara et al. disclose in their '877 patent specification is a thirteen term non-linear polynomial equation having thirteen coefficients and including squared and cubed terms based on four independent variables (IR sensor voltage $V_r$, ambient temperature sensor voltage $V_a$, waveguide temperature $V_w$, and a null amplified voltage $V_n$):

$$T_t = a_1 + a_2\{V_t - V_n\} + a_3\{V_t - V_n\}^2 + a_4\{V_t - V_n\}^3 +$$
$$a_5 V_a + a_6 V_a^2 + a_7 V_a^3 + a_8 V_w + a_9 V_w^2 + a_{10} V_w^3 +$$
$$a_{11}\{V_t - V_n - V_a\} + a_{12}\{V_t - V_n - V_a\}^2 + a_{13}\{V_t - V_n - V_a\}^3$$

O'Hara et al. state that the values for these independent variables are collected through a calibration procedure in which each thermometer is controlled to sequentially measure four fixed-temperature "blackbody" temperature references (85° F., 95° F., 102° F. and 110° F.) over a range of ambient temperatures. O'Hara et al. use regression techniques to analyze the collected data to provide the coefficients of the equation, which are stored in the corresponding thermometer memory. O'Hara et al. add offsets to certain coefficients to reduce truncation errors.

At temperature taking time, O'Hara et al's microcomputer within the thermometer uses floating point arithmetic to calculate or look up the non-linear equation results based on these coefficients, and the result is displayed on the display. O'Hara et al. claim that in this way, all sensor input is "mapped" to yield a target temperature according to a supposed thirteen-dimensional surface map that was determined at calibration time. A similar approach is disclosed in U.S. Pat. No. 5,150,969 to Goldberg et al.

O'Hara et al and Goldberg et al each claim that their non-linear systems provide higher accuracy than is available using the Stefan-Boltzmann equation. However, the problem with these approaches is that—despite their great complexity—they have not solved the accuracy problem.

The Present Invention Uses Empirical Data to Provide More Accurate Temperature Measurement The present invention provides a radically different approach to determining temperature in a non-contact infrared thermometer. Rather than basing temperature determination on a complex equation describing a non-linear system, the present invention goes against the conventional wisdom by opting for a far more straighforward temperature determining technique that turns out to have substantially greater accuracy.

In contrast to the non-linear systems and techniques described above, the present invention uses an empirical data set to determine patient temperature. The empirical data set is collected during a testing process, and is explicitly stored in a non-volatile memory within the thermometer. At temperature measuring time, the thermometer accesses the appropriate cell in the non-volatile memory to determine temperature—thus directly outputting the same temperature output empirically collected for the same conditions at testing time.

To achieve a high degree of accuracy, the empirical data set provided by the present invention represents actually measured thermometer sensor outputs over a substantial number of target and ambient temperature points within the thermometer's operating range. In accordance with one example, on the order of ten to fifteen percent of the total operating range may be collected. This may typically result in collection of on the order of ten to fifteen thousand data points. The substantial size of the empirical data set eliminates guesswork and estimation—since the most accurate indication of how a thermometer will perform under certain conditions is a record of how it previously performed under those same conditions.

Although the highest possible accuracy can be achieved by exposing each thermometer unit to every possible target/ambient temperature combination within the thermometer's desired operating range and resolution (e.g., each 0.1° F. target temperature increment for each 0.1° F. ambient temperature increment over the target and ambient temperature ranges described above in connection with the ASTM standard), this may not be practical for certain applications (e.g., a relatively inexpensive, handheld tympanic thermometer). In particular, developing such a complete data set would require testing of each individual thermometer unit for many weeks in an environmental chamber.

To reduce total testing time while achieving nearly comparable accuracy, the present invention systematically collects the empirical data in sufficient quantities to adequately cover a range of reference target and ambient temperatures. The resulting empirical data set defines a large number of calculated data points. There is no need for complex non-linear polynomial calculation or other curve-fitting techniques or complex systems modeling. Simple linear functions such as averaging (i.e., adding two collected empirical data points and dividing by two) can be used to efficiently and rapidly supply any data points not actually collected.

Furthermore, in accordance with a further aspect provided by the present invention, the collected empirical data is used (e.g., in conjunction with manufacturer component specifications) to allow the thermopile cold junction temperature to be accurately ascertained. For example, a first step in a temperature determination process may be to ascertain cold junction temperature based on such empirical data. This is radically different to an approach in which the thermometer does not determine what the ambient temperature is.

The present invention also provides a unique thermometer testing and empirical data collection process for efficiently collecting the empirical data set. In accordance with this aspect provided by the present invention, empirical data is collected through the use of variable temperature reference targets and ambient temperature swept across a range. In more detail, each individual thermometer instrument is mated with a "black body" temperature reference target, and the pair are placed into an environmental chamber. An electrically controllable shutter is placed between the black body reference target and the thermometer. The opening and closing of the shutter may be controlled by the thermometer itself or any suitable process controller.

The temperature of the black body is set to a particular reference temperature, and the environmental chamber is controlled to sweep its temperature across the desired ambient temperature operating range of the thermometer (e.g., 60.8° F. to 104° F.). The thermometer controls the shutter to open for a short time duration each time the thermometer's cold junction or "ambient" temperature sensor senses the next incremental temperature in a sequence (e.g., each 0.1° F. ambient temperature increment). The thermometer's infrared sensor measures the radiation flux $\Phi b$ each time the shutter is opened, and a data point consisting of the two thermometer sensor (10, 12) outputs $T_s$, $\Phi_b$ and the blackbody reference temperature is stored. This ambient temperature "sweep" for a particular black body reference temperature preferably develops a "band" of data that spans the ambient temperature operating range of the thermometer.

Once the ambient temperature operating range has been covered for one target reference temperature, the blackbody temperature is incrementally changed to a new value and the process is repeated to collect a further "band" of data. Data collection continues in this way until a sufficient number of data "bands" corresponding to different blackbody reference temperatures have been collected to substantially cover the thermometer's desired target temperature range (94° F. to 108° F.) with a desired resolution (e.g., each 0.5° F. target temperature increment).

The resulting empirical data set has a high degree of accuracy across the ambient and target temperature operating ranges of the thermometer. A linear function such as simple averaging may be used to derive data points not actually collected but which fall between the collected data "bands".

BRIEF DESCRIPTION OF THE DRAWINGS

These, as well as other objects and advantages of this invention, will be more completely understood and appreciated by carefully studying the following more detailed description of a presently preferred exemplary embodiment of the invention in conjunction with the accompanying drawings, of which:

FIG. 5 shows example empirical data collected by the FIG. 2 test system;

FIG. 6A shows example collected empirical data arranged in a matrix;

FIG. 6B shows the FIG. 6 table completed by using a linear function to derive additional data between the collected data points which are then filled into the cells in the matrix;

FIG. 7 shows an example cold junction temperature memory lookup table;

FIGS. 8A and 8B show example target temperature memory lookup tables; and

DETAILED DESCRIPTION OF PRESENTLY PREFERRED EXAMPLE EMBODIMENTS

Figure 2:
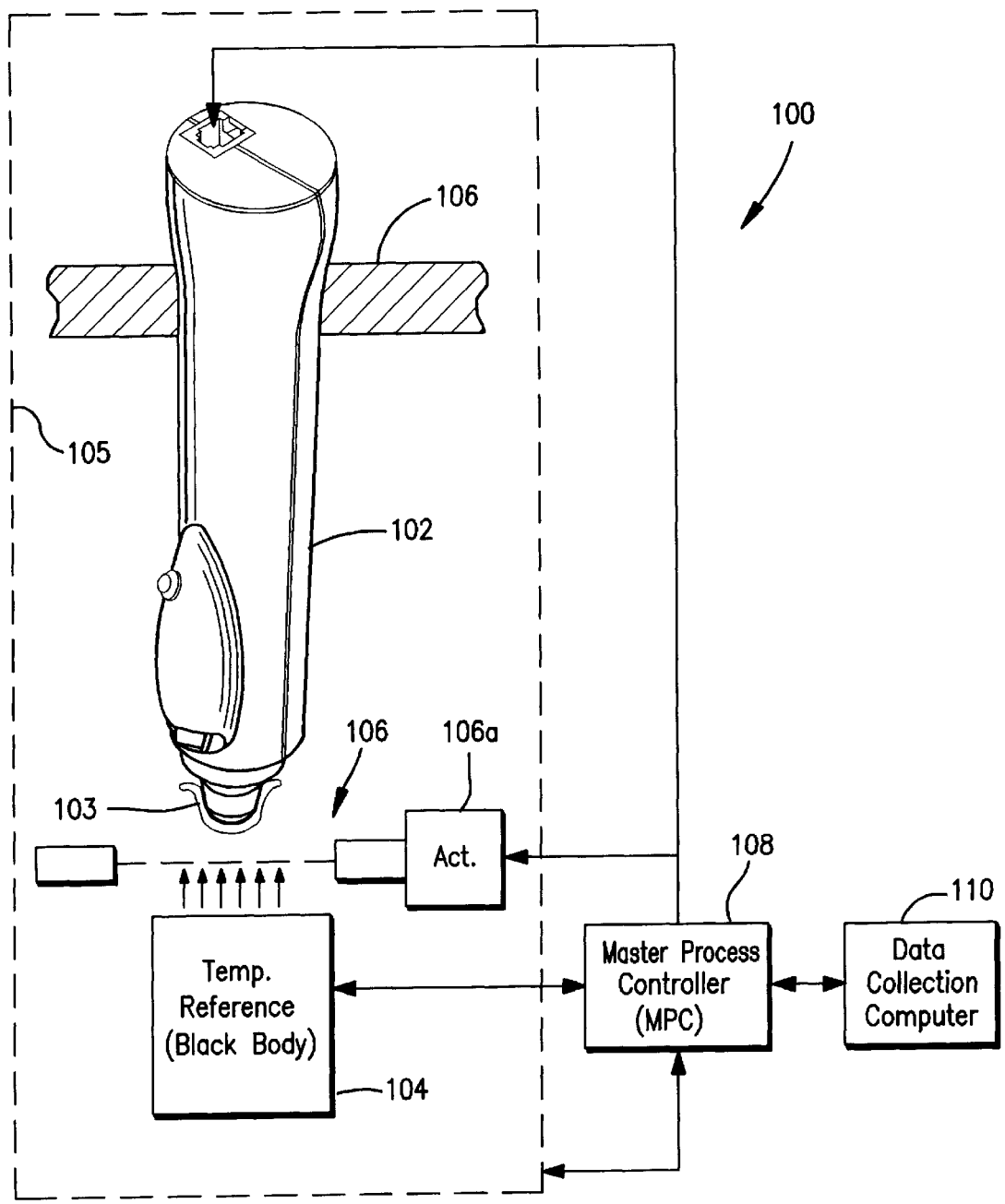
FIG. 2 shows an example thermometer measuring unit test system.

FIG. 2 shows an example testing system 100 provided in accordance with the present invention. Testing system 100 tests a tympanic temperature measuring system 102 by gathering a large quantity of empirical data over an operating range of ambient and referenced target temperatures to provide a requisite degree of temperature measuring resolution.

Figure 1:
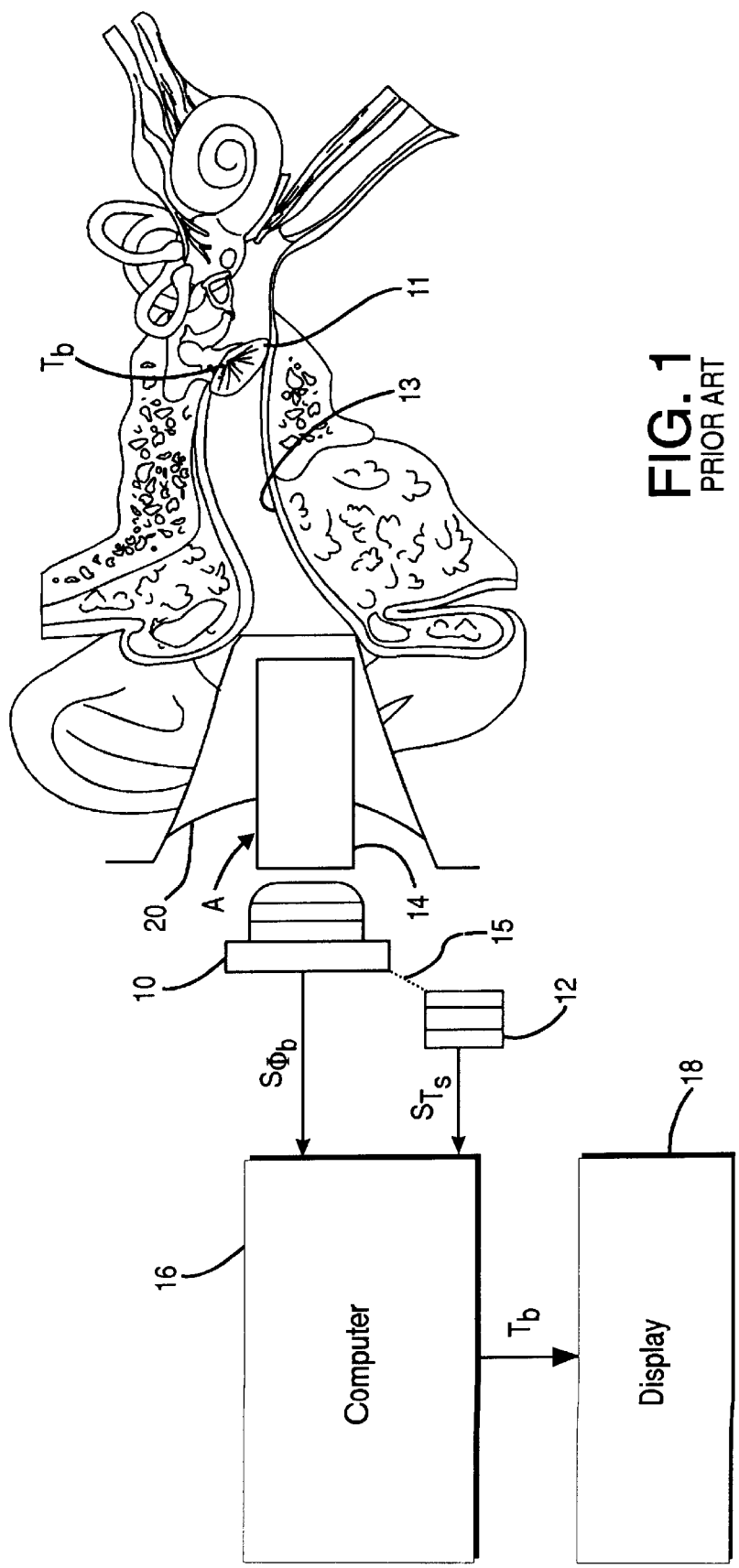
FIG. 1 is a is a simplified diagram of a prior art tympanic thermometer.

Tympanic temperature measuring system 102 may be generally of the type shown in prior art FIG. 1. An example improved tympanic temperature measuring system 102 may be as described in copending commonly assigned U.S. patent application Ser. No. 09/089417, now allowed of Canfield et al. entitled "Tympanic Thermometer With Modular Sensing Probe" filed Jun. 3, 1998 (Attorney Docket No. 2204-15).

Tympanic temperature measuring sytem 102 is mounted within an environmental chamber 105 using a suitable test fixture 106. Test fixture 106 holds tympanic temperature measuring system 102 in a position such that it is aimed at a temperature reference 104. A shutter 106 disposed between the tympanic temperature measuring system 102 and the temperature reference 104. The temperature reference 104 emits infrared radiation which tympanic temperature measuring system 102 can sense whenever shutter 106 is opened. Shutter 106 prevents the infrared radiation radiated by temperature reference 104 from reaching tympanic temperature measuring system 102 when the shutter is closed.

An actuator 106a is used to electrically open and close shutter 106. In this example, actuator 106a is controlled by tympanic temperature measuring system 102—either directly or via a master process controller 108. Master process controller 108 also controls environmental chamber 105 and temperature reference 104.

Master process controller 108 thus can control the temperature of environmental chamber 105 and the temperature of temperature reference 104, as well as the open/closed state of shutter 106. Master process controller 108 also collects parameters measured by tympanic temperature measuring system 102 and provides them to a data collection computer 110. Data collection computer 110 develops an empirical data set based on the testing.

Figure 3:
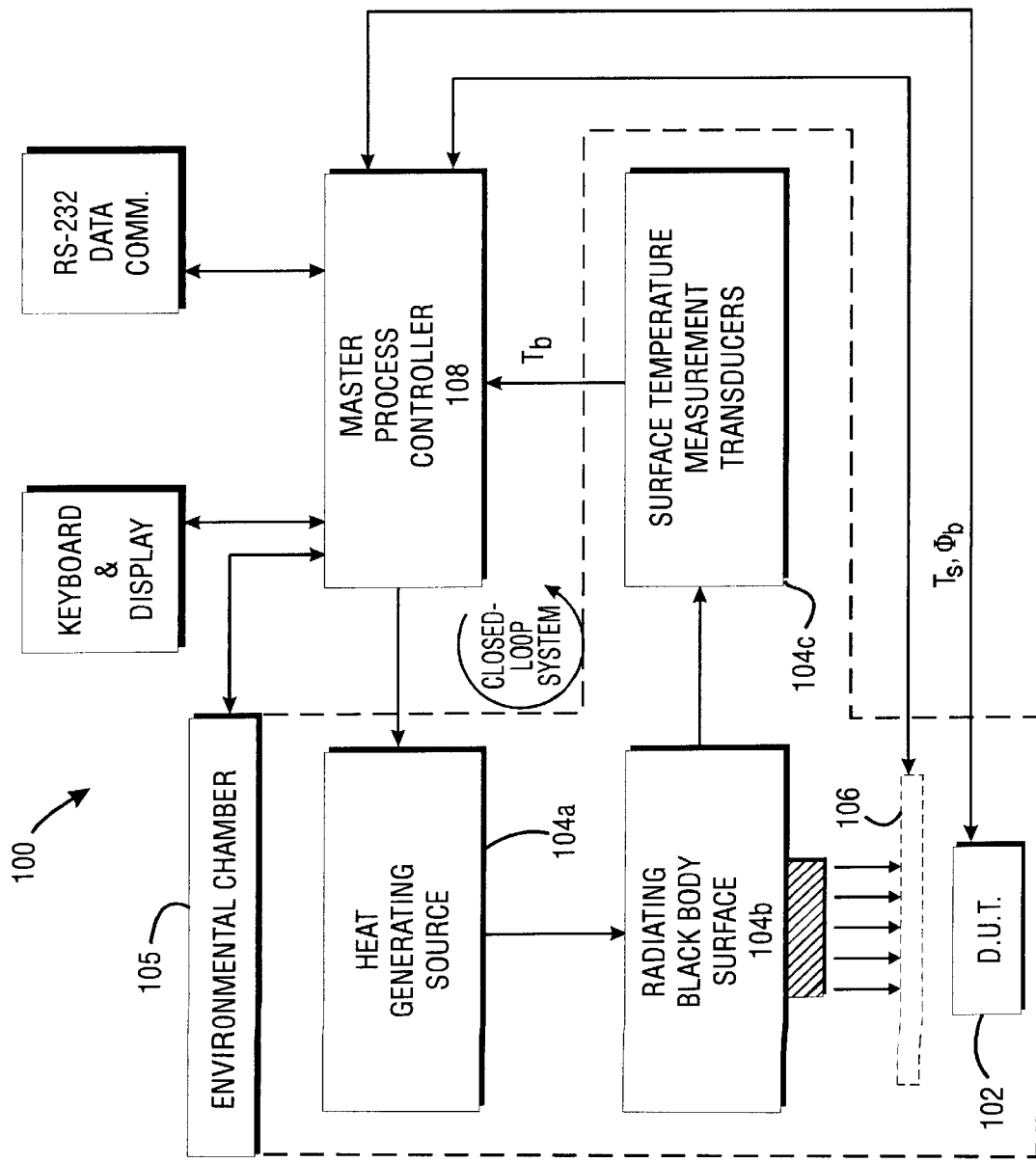
FIG. 3 is a more detailed block diagram of the FIG. 2 test system.

FIG. 3 shows certain aspects of testing system 100 in more detail. In the FIG. 3 example, temperature reference 104 comprises a heat generating source 104a, a radiating black body surface 104b, and surface temperature measurement transducers 104c. Master process controller 108 controls the output of heat generating source 104a which generates heat for radiation by radiating black body surface 104b. In one embodiment, heat generating source may comprises an electrical heating coil fed by a constant current source. In another embodiment, heat generating source may supplied a fluid flow the temperature of which is precisely controlled. Other temperature control arrangements are well known to those skilled in the art.

Radiating black body surface 104b preferably has a precisely controlled emissivity that closely approximates the emissivity of the human outer ear canal and eardrum. See ASTM standard specification described above. As is well known, this emissivity can be achieved by using controlled thicknesses of special paints.

The temperature of radiating black body surface 104b is precisely monitored by precision calibrated surface temperature measurement transducers 104c. These temperature measurement transducers 104c provide their output to master process controller 108, which may average them to develop a very accurate and precise measurement of the temperature of radiating black body surface 104b. Based on the temperature measured by transducers 104c, master process controller 108 provides a closed loop control system to precisely control the temperature of radiating black body surface 104b.

Master process controller 108 also precisely monitors and controls the temperature of environmental chamber 105 using conventional and environmental chamber temperature measuring and control. Master process controller 108 also receives the digitized $\Phi_b$ output of thermopile 10 and the digitized $T_s$ output of thermistor 12 provided by tympanic temperature measuring system 102.

Figure 4:
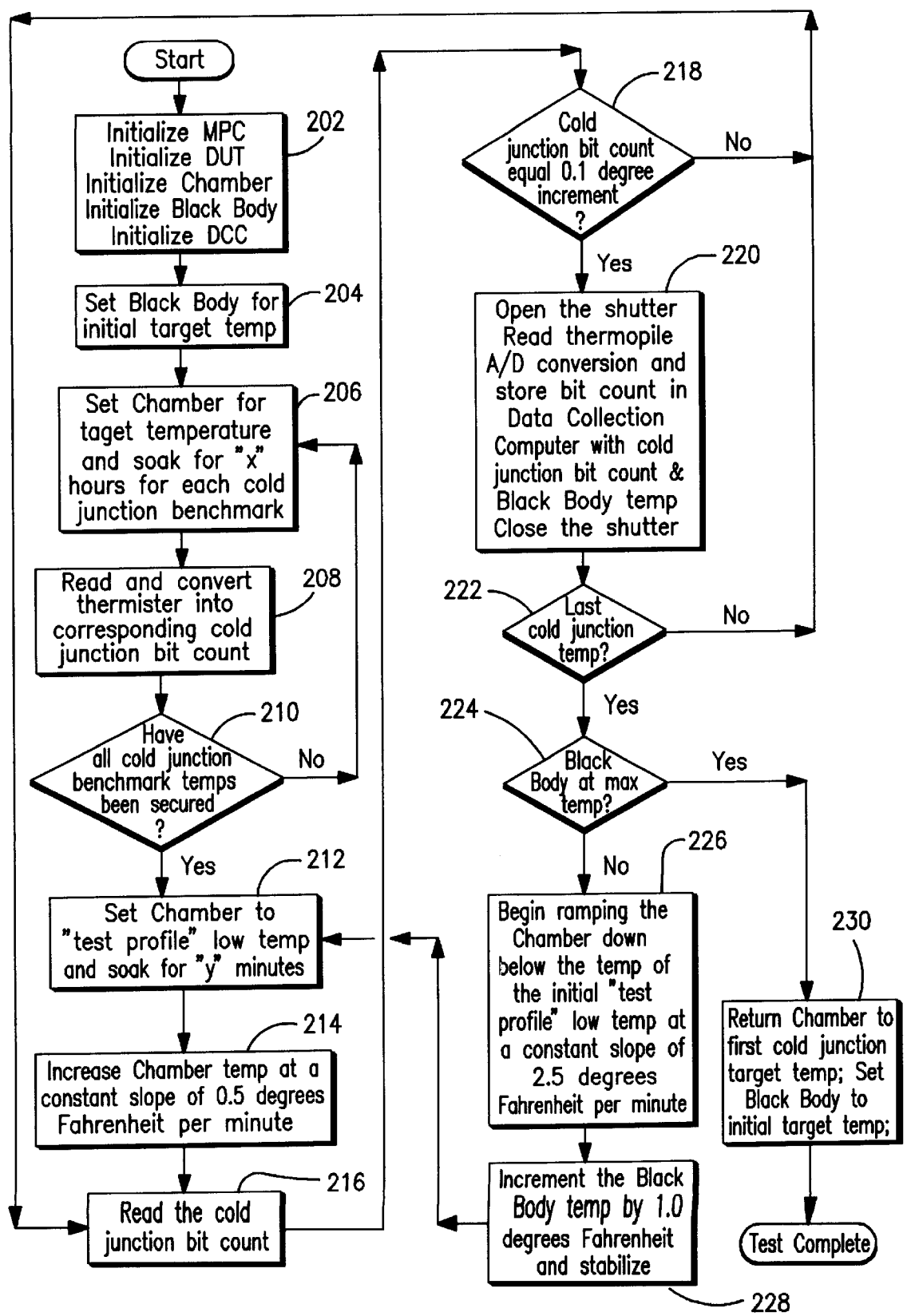
FIG. 4 is a flowchart of example program control steps performed by the FIG. 2 test system.

FIG. 4 shows an example flowchart performed by the testing system shown in FIGS. 2 and 3 to collect empirical data from tympanic temperature measuring system 102. Master process controller 108 first is initialized, and may then initialize the tympanic temperature measuring system 102, environmental chamber 105, temperature reference 104 and the data collection computer 110 (block 202). Initialization of tympanic temperature measuring system 102 may involve downloading a testing program into the system for execution by a microcontroller therein.

Master process controller 108 next sets temperature reference 104 to an initial target temperature (block 204), and sets environmental chamber 105 to a particular ambient target temperature (block 206) in preparation for the first testing phase in this example.

This first testing phase (in this particular example) is to precisely benchmark the output of thermistor 12 (which measures the temperature of the cold junction of thermopile 10) for several different benchmark ambient temperatures. This first phase is performed without opening shutter 106 to expose the tympanic temperature measuring system 102 to any heat radiated by temperature reference 104.

Tympanic temperature measuring system 102 is preferably left within environmental chamber 104 at the precisely controlled "benchmark" ambient temperature set by block 206 for a number of hours to establish a cold junction bench mark (i.e., a thermistor 12 digitized output value bit count precisely corresponding to a certain known cold junction temperature) (block 206). Once sufficient time has passed to ensure that tympanic temperature measuring system 102 (and, in particular, the cold junction of thermopile 10) has precisely stabilized at the ambient temperature benchmark, master process controller 108 controls tympanic temperature measuring system 102 to read and convert the output of its thermistor 12 into a corresponding cold junction bit count (block 208)—thus establishing a first cold junction benchmark.

Blocks 206, 208 may be performed for several different cold junction benchmark temperatures (decision block 210). At the end of this process, testing system 100 has precise thermistor 12 output values corresponding to precisely known cold junction temperatures. These cold junction benchmark temperatures in conjunction with the characteristic data sheet provided by the manufacturer of thermistor 12 are used in the preferred embodiment to precisely determine the temperature of the cold junction of thermopile 10 based on the digitized bit count output of thermistor 12.

Once the cold junction benchmark temperatures have been obtained ("yes" exit to decision block 210), master process controller 108 sets environmental chamber 105 to a low ambient temperature within a test profile temperature range, and tympanic temperature measuring system 102 is preferably allowed to precisely stabilize to this temperature by resting within environmental chamber 105 for a sufficient amount of time (block 212). Master process controller 108 then begins increasing (i.e., upwardly sweeping) the temperature within environmental chamber 105 at a constant slope of (for example, 0.5° Fahrenheit per minute in one example) (block 214)—while continually monitoring the output of thermistor 12 (block 216).

When master process controller 108 (or tympanic temperature measuring system 102) determines, based on the information gathered by blocks 206–210 and the characteristic data for thermistor 12, that the output of thermistor 12 corresponds to an incremental 0.1° F. cold junction measuring point (decision block 218), the master process controller 108 and/or the tympanic temperature measuring system 102 controls actuator 106a to momentarily open shutter 106 (block 220). While shutter 106 is open, the output of thermopile 10 is read and converted by tympanic temperature measuring system 102. This resulting bit count is stored by data collection computer 110 along with the bit count output of thermistor 12 and the precise temperature of temperature reference 104 as indicated by surface temperature measurement transducers (block 220).

Even though block 204 sets the temperature of temperature reference 104 to a particular target temperature, it has been found that sweeping the ambient temperature within environmental chamber 205 tends to add heat to or remove heat from temperature reference 104. One approach would be to maintain temperature reference 104 at a precisely controlled temperature despite the change in ambient temperature. However, in this particular example, reference target 104 is permitted to change temperature slightly and its actual temperature at the time shutter 106 is opened is collected along with the digitized output of thermopile This is possible because it is not necessary to precisely calibrate measurements for a particular fixed black body temperature in the preferred embodiment.

The process performed by blocks 216–220 is repeated for the next increment (e.g., 0.1° F.) cold junction bit count outputted by thermistor 12 as master process controller 108 continues to increase the environmental chamber 105 temperature at the constant slope. When the upper end of the ambient temperature operating range (e.g., 110° F.) has been reached (decision block 222), data collection computer 110 will have gathered a "band" of empirical data corresponding to each 0.1° F. increment within the desired ambient temperature operating range of tympanic temperature measuring system 102 for an approximate particular black body reference target temperature along with the precise black body reference target temperature corresponding to each of these empirical data points. Specifically, each data point in this example includes (a) the temperature of temperature reference 104 at the time the data point was collected; (b) the digitized bit count output of thermistor 12; and (c) the digitized bit count output of hermopile 10.

The process performed by blocks 212–222 is then repeated or another black body reference temperature. In the preferred embodiment, this process is repeated for a relatively large number of black body reference temperatures—in one example, for every 0.5° F. temperature within the required target temperature operating range of tympanic temperature measuring system 102.

While it might at first appear practical and possible to simply at this point change the black body reference temperature and ramp the environmental chamber 105 ambient temperature in the opposite direction (i.e., downwardly) while taking new "band" of measurements, it has been experimentally determined that the thermodynamics are different during ramping up as opposed to ramping down of the ambient temperature. Accordingly, in the preferred embodiment, all data points are collected while sweeping the temperature of environmental chamber 105 upwardly from a lower temperature to a higher temperature—since this better simulates the heat transfer direction when tympanic temperature measuring system 102 is in the patient's ear and is increasing its cold junction temperature due to the so-called drawdown effect.

Accordingly, assuming that there are additional temperature reference points for which empirical data is to be collected ("no" exit to decision block 224), master process controller 108 begins ramping the environmental chamber temperature 105 down below the temperature of the initial test profile low temperature—preferably at a constant, more rapid slope (e.g., 2.5° F. per minute) (block 226) while adjusting the temperature of temperature reference 104 to a new reference temperature (block 228). In one example, master process controller 108 increments the temperature of black body reference 104 by 1.0° F. and allows it to stabilize before repeating the steps of blocks 212–222 for the new black body reference temperature. Once this overall process has been repeated to collect all desired empirical data points ("yes" exit to decision block 224), master process controller 108 returns environmental controller to an initial cold junction temperature and sets the temperature reference 104 to the initial target temperature for testing of a new tympanic temperature measuring system 102 (block 230).

FIG. 5 shows an example of actual data collected by data collection computer 110 using the process shown in FIG. 4. As can be seen, data collection computer collects four different data parameters: the temperature of temperature reference 104 (column 302), the cold junction temperature in degrees Fahrenheit (column 304), the digitized bit count output of thermistor 12 (column 306), and the digitized output of thermopile 10 (column 308). The particular data shown in FIG. 5 was collected for each 0.1° F. ambient temperature increment while environmental chamber 105 swept through a portion of its ambient temperature range from 65.3° F. to 69.1° F. The temperature of temperature reference 104 was nominally set at 101.7°, but due to the interaction between the change in ambient temperature and the temperature of temperature reference 104, it is difficult (nor is it necessary in this example) to maintain the temperature of temperature reference 104 at a precise fixed reference temperature. In particular, sweeping of the ambient temperature tends to add or subtract heat from the temperature reference 104—thereby changing its temperature slightly. Accordingly, rather than simply assuming that the temperature reference 104 is at a precisely known temperature, testing system 100 in the preferred embodiment actually measures the temperature of temperature reference 104 at each data collection point.

The FIG. 4 process does not, in the preferred embodiment, attempt to collect an empirical data point for each and every possible temperature measurement within the ambient temperature and target temperature operating ranges of tympanic temperature measuring system 102. Although such exhaustive empirical data collection would maximize accuracy, it would require a large amount of testing time for each individual tympanic temperature measuring system 102. Therefore, data is collected for a sufficient number of black body reference temperatures to provide a requisite degree of accuracy covering the operating range of system 102 without being exhaustive. FIG. 6 shows an example data collection matrix resulting from the FIG. 4 data collection process. The process described in FIG. 4 results in "bands" of data that span the entire desired ambient and target temperature operating ranges of tympanic temperature measuring system 102, these "bands" being sufficiently closely spaced so that a linear function (e.g., simple averaging) can be used to supply the data points between the "bands" that was not empirically collected. Referring to FIG. 6A, one such "band" of data 310a is collected at a black body temperature reference 104 temperature that is nominally 101.0° F. but which—as FIG. 6A demonstrates—changed during the particular up-ramping of the environmental chamber 105 used to gather this particular "band." Similarly, a second data band 310b is gathered based upon sweeping of environmental chamber 105 from low to high ambient temperatures using a nominal black body temperature reference 104 temperature of 101.5° F. (but which actually measured 101.7° F., 101.9° F. for the particular ambient temperature data points of 65.3° F.–69.1° shown. The "data" within each cell of the FIG. 6A matrix is the bit count of the output of thermopile 10—the bit count of the output of thermistor 12 being used to generate the left-hand (cold junction degree) column 312 and the collected black body temperature being used to generate the black body temperature upper row 314 of the matrix.

FIG. 6B shows that it is possible using a linear function to explicitly fill in all other cells of the FIG. 6A matrix based on the empirical data shown in FIG. 6A. In particular, the other cells of the matrix may be generated by simple linear averaging techniques. The linear averaging may be performed either at testing time or a temperature taking time. If one wants to store, within tympanic temperature measuring system 102, a complete lookup table of values corresponding to each possible ambient and target temperature within its operating range, then the data between the empirical data bands 310 may be generated as part of the testing process using a linear function such as averaging, and the result stored into non-volatile memory within tympanic temperature measuring system 102. On the other hand, the processor within tympanic temperature measuring system 102 is capable of efficiently performing the simple linear calculations required to derive the data points between empirically collected data points.

In either case, the specific preferred embodiment in this example stores the collected empirical data in a data matrix that preserves the information representing distance between data points shown in FIG. 6A. This distance information is necessary to the averaging process. One way of preserving this distance information is to store the collected empirical data within a large matrix memory and using the matrix itself to indicate how far apart the empirically collected data points are. Other storage representations that preserve this distance information can be used.

FIG. 7 shows one part of an example memory matrix stored within tympanic temperature measuring system 102 based upon the FIG. 4 data collection process. The particular lookup table 320 shown in FIG. 7 is used to correlate thermistor 12 bit count output to both actual temperature in degrees Fahrenheit (row 324), and to a memory address within a large memory matrix in which all empirical thermopile output data collected at that particular measured cold junction temperature is stored (row 326). In this example, the lookup table address begins at FF00H (hexadecimal) in increments to FFFFH as an example. The FF00H corresponds to 66.0° F. (e.g., thermistor 12 output bit count 21380). In this example, the address FF01H would correspond to 66.1° F., etc. The actual EPROM data for a given address represents the cold junction bit count for a tenth of a degree resolution. Once the actual or nearest cold junction data is secured, an incremental counter "points" to or indicates the EPROM high byte address corresponding to the cold junction range determined. Furthermore, in this example, the cold junction bit count corresponds to an actual known temperature (as represented in row 324). Thus, in this embodiment, tympanic temperature measuring system 102 can always determine the precise cold junction temperature in degrees Fahrenheit corresponding to any temperature measurement.

FIGS. 8A and 8B show example empirical lookup tables to which the FIG. 7 lookup table may point. As will be understood, the FIG. 8A table stores only the actually collected empirical data points while the FIG. 8B table stores those collected empirical data points along with intermediate data points determined through a linear analysis of the collected data points. In each of these tables, the left-hand column 330 corresponds to the high byte address within the EPROM; the next column 332 corresponds to the cold junction bit count; and the next column corresponds to the actual cold junction temperature in degrees Fahrenheit. The upper row 336 of the matrix corresponds to the low byte memory address, and the next row 336 corresponds to the black body temperature in degrees Fahrenheit.

Figure 9A:
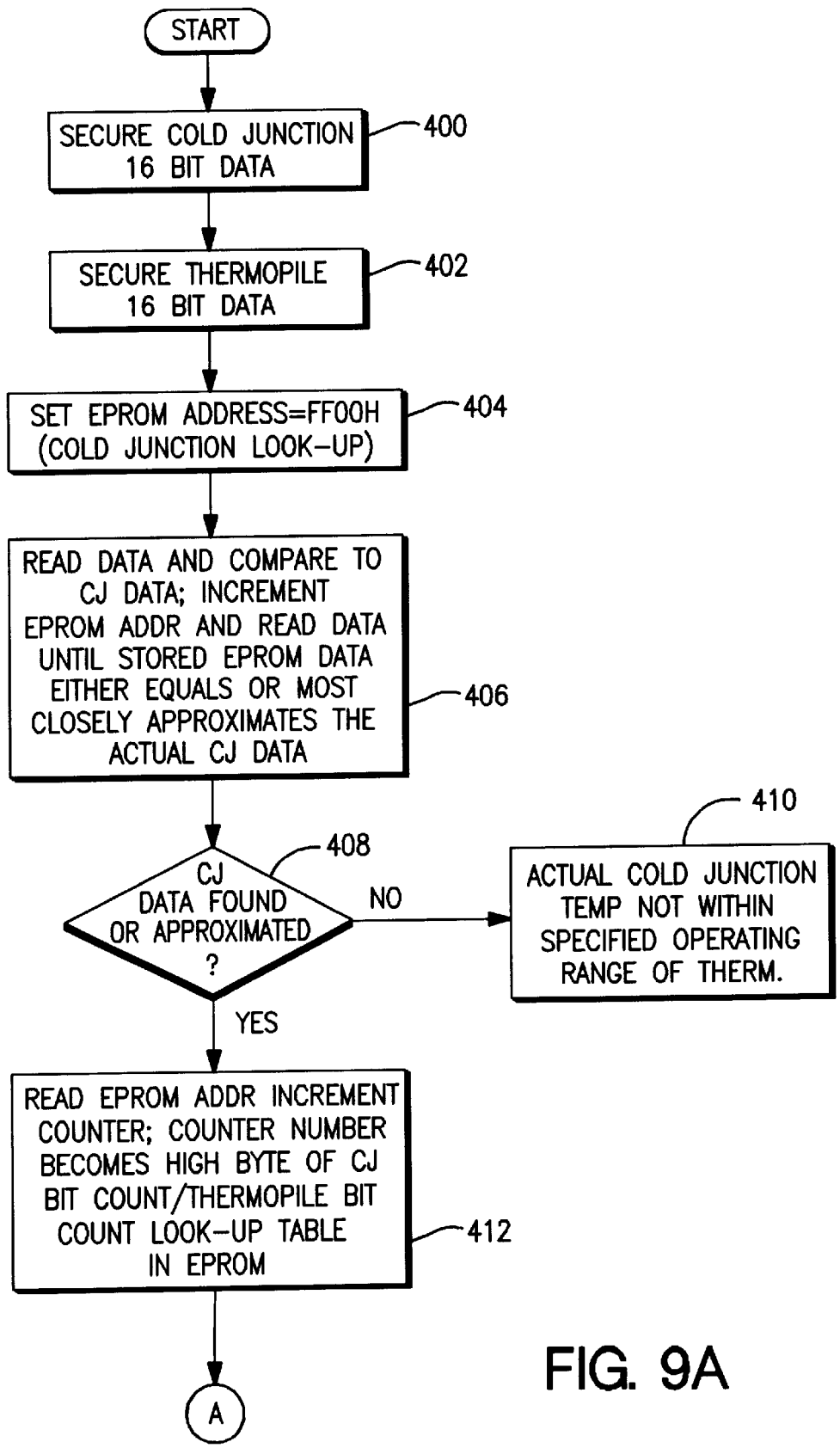
FIGS. 9A–9C show a flowchart of example steps performed by a tympanic thermometer under computer software control to measure and indicate patient temperature based on the example stored empirical information shown in FIGS. 7 and 8A or 8B.
Figure 9B:
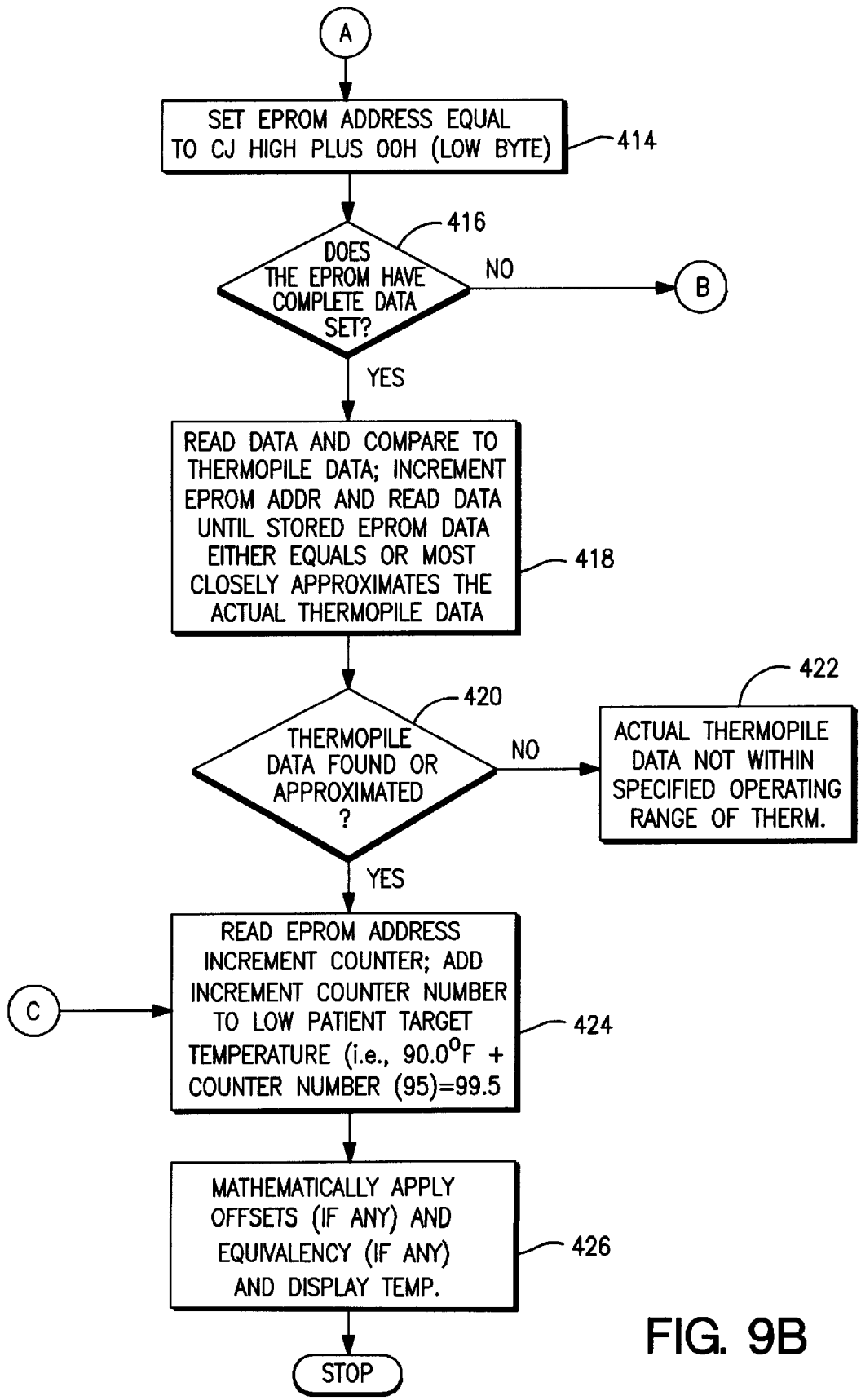
Figure 9C:
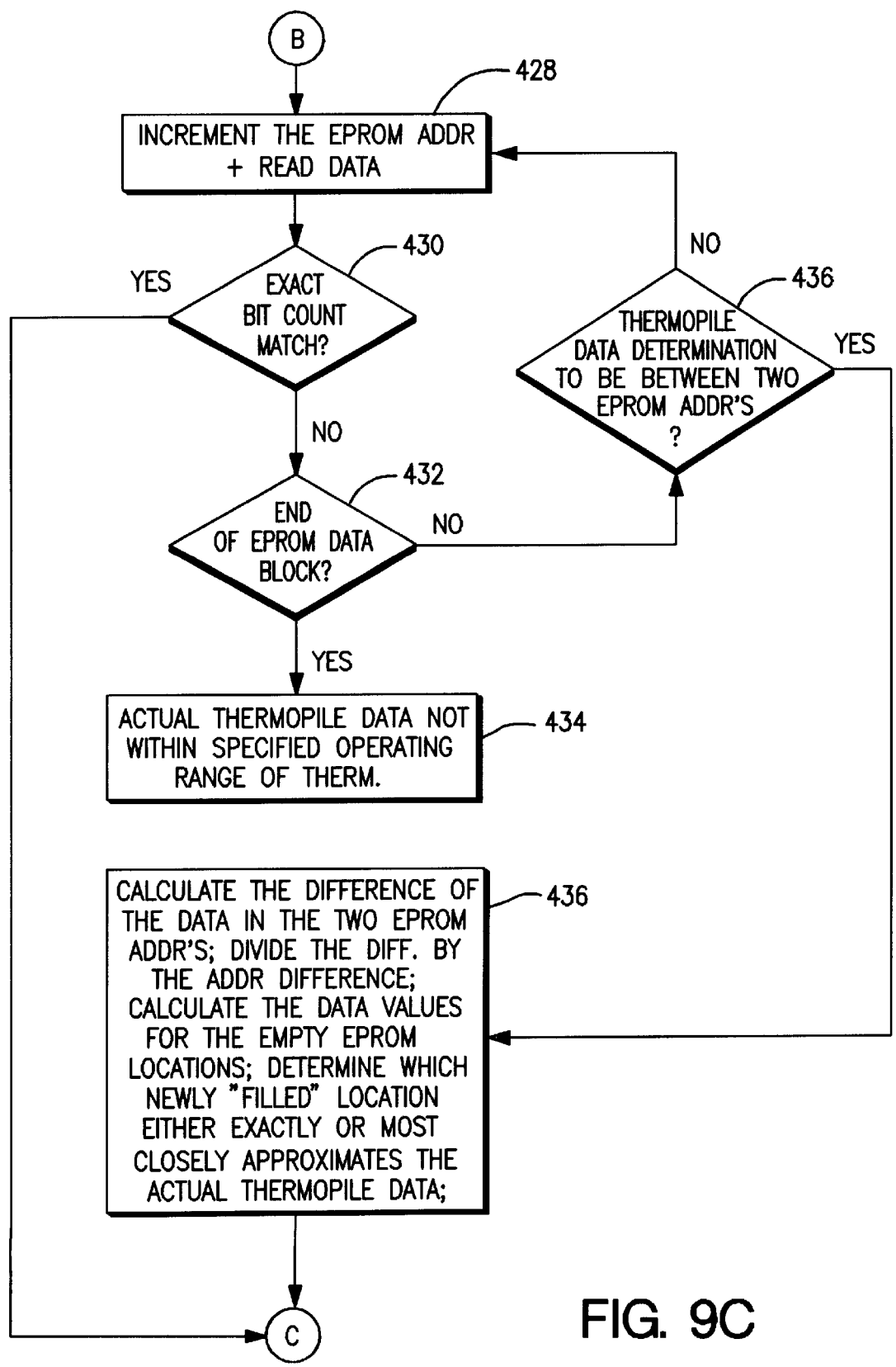

FIGS. 9A–9C show an example temperature measuring process performed by tympanic temperature measuring system 102 based on the stored tables of FIG. 7 and FIG. 8A or 8B. To measure and display a temperature, tympanic temperature measuring system 102 first secures the cold junction bit count output of thermistor 12—preferably using the least significant 16 bits of data provided by a 20-bit resolution A/D converter (block 400). Tympanic temperature measuring system 102 also secures the digitized output of thermopile 10 (block 402). Tympanic temperature measuring system 102 then accesses the FIG. 7 table (block 404), reads the data stored in row 322 and searches this data until it finds a cold junction bit count that exactly matches or most closely approximates the digitized cold junction bit count secured by block 400 (block 406). If exactly or closely approximating data is not located, the cold junction temperature is out of range and an error condition is detected ("no" exit to decision block 408, block 410). Otherwise, tympanic temperature measuring system 102 reads the EPROM address (FIG. 7, row 326) for use as an "increment counter," which counter number becomes the high byte of an address used to access the memory matrix of FIG. 8A or 8B (block 412). Tympanic temperature measuring system 102 sets this "increment counter" as the high byte (block 414) and uses it to access the table of FIG. 8A or 8B as the case may be (block 414). In the case where tympanic temperature measuring system 102 stores the complete data set shown in FIG. 8B ("yes" exit to decision block 416), then the tympanic thermometer temperature measuring system 102 reads the row of the FIG. 8B table corresponding to the low byte address obtained by block 414 to access all stored data corresponding to that particular cold junction temperature (block 418). Tympanic temperature measuring system 102 searches through this data until it locates the stored data that either equals or most closely approximates the actual thermopile 10 bit count output (block 418). If no such data is found ("no" exit to decision block 420), the measured temperature is not within range and an error condition arises (block 422). Otherwise ("yes" exit to decision block 420), tympanic temperature measuring system 102 determines, from the position of the accessed data within the memory matrix, which black body temperature it corresponds to (block 424). Tympanic temperature measuring system 102 mathematically applies any offsets and equivalents (e.g., to provide for oral or rectal equivalent temperatures as opposed to core temperature), and displays the resulting value as the temperature of the patient (block 426).

Referring to FIG. 9C, if the tympanic temperature measuring system 102 stores only the empirically collected data (see FIG. 8A), the tympanic temperature measuring system 102 accesses the data within the data matrix and determines whether any stored empirical data that exactly corresponds to the current digitized thermopile 10 data output (block 428). If there is an exact bit count match ("yes" exit to decision block 430), then the steps shown in FIG. 9B, blocks 424, 426 are performed. Otherwise ("no" exit to decision block 430), the tympanic temperature measuring system 102 determines whether the end of the data block for that particular cold junction temperature has been reached (decision block 432). If the end has been reached before two data values that the measured thermopile data output falls between have been located, the actual thermopile data is not within the specified operating range and an error condition arises ("yes" exit to decision block 432; block 434). Otherwise ("no" exit to decision block 432), the tympanic temperature measuring system 102 accesses and reads the two empirical data points that "bracket" the current actual thermopile 10 data output (decision block 436). The current patient temperature is linearly derived from these two empirical values by calculating the difference between these two data points and dividing the difference by the difference in addresses (i.e., the "spacing" between the data points in terms of black body temperature) (block 436). This averaging process derives the data value for the empty location, this derived data value being processed by blocks 424 and 426 for display.

While the invention has been described in connection with what is presently considered to be the most practical and preferred embodiment, it is to be understood that the invention is not to be limited to the disclosed embodiment. As one example, it is possible to collect sensed parameters in addition to the thermistor and thermopile outputs. On the contrary, it is intended to cover various modifications and equivalent arrangements included within the spirit and scope of the appended claims.

I claim:

1. A method of developing measurement data for a tympanic thermometer comprising:
    (a) systematically collecting, across a range of reference target and ambient temperatures, empirical thermometer measurement data in sufficient quantities and in such a way as to provide an empirical data set comprising a number of data points;
    (b) using a linear function to supply at least one intermediate data point not collected by step (a); and
    (c) combining said empirical data set with said at least one intermediate data point to provide a measurement data set for use by a tympanic thermometer to develop a temperature measurement.

2. A method as in claim 1 wherein the tympanic thermometer has a writable memory, and the method further comprises:
    (d) writing said combined collected and said supplied data points into said tympanic thermometer writable memory.

3. A method as in claim 1 wherein said step (b) comprises averaging at least two collected data points to supply an intermediate data point or data points.

4. A method as in claim 1 wherein said step (a) comprises gathering on the order of at least 10% of the total data points within a thermometer's specified operating range.

5. A method as in claim 2 wherein step (d) comprises writing said combined collected and said supplied data points into a lookup table.

6. A method of operating an ear thermometer including an infrared sensor and a temperature sensor, said infrared sensor measuring the infrared flux between said infrared sensor and a target, said temperature sensor measuring the temperature of said infrared sensor, said method comprising:
    collecting and storing, within the ear thermometer, an empirical data set comprising a number of data points, each data point specifying (a) an infrared flux measured by said infrared sensor, (b) a corresponding temperature measured by said temperature sensor, and (c) a corresponding reference target temperature;
    optically coupling said infrared sensor to a person's ear;
    measuring (a) the infrared flux between said infrared sensor and the person's ear tissue, and (b) the temperature of said infrared sensor cold junction; and
    accessing the collected stored empirical data set to determine the reference target temperature corresponding to said measured infrared flux and said cold junction temperature.

7. A method of operating an ear thermometer including an infrared sensor and a temperature sensor, said infrared sensor measuring the infrared flux between said infrared sensor and a subject, said temperature sensor measuring the temperature of said infrared sensor, said method comprising:

using said ear thermometer to collect an empirical data set comprising a number of data points, each data point specifying (a) an infrared flux measured by said infrared sensor, (b) a corresponding temperature measured by said temperature sensor, and (c) a corresponding reference target temperature;

storing said empirical data set in the thermometer; and taking a person's temperature by performing the following steps:

(1) optically coupling said infrared sensor to the person's ear canal;

(2) measuring the infrared flux between said infrared sensor and the person's ear tissue;

(3) measuring the temperature of said infrared sensor with said temperature sensor;

(4) accessing the stored empirical data set within the thermometer to determine the reference target temperature corresponding to said measured infrared flux and said measured infrared sensor temperature; and (5) providing an indication of said corresponding reference target temperature as the temperature of said person.

8. A method as in claim 7 wherein said storing step comprises the step of storing at least on the order of at least 10% of the total data points within a thermometer's specified operating range.

9. A method as in claim 7 wherein said storing step comprises storing said data points in a non-volatile randomly accessible memory.

10. A method as in claim 7 wherein said storing step comprises storing said data points in a lookup table.

11. A method as in claim 7 further including the step of correcting said indication to provide an oral equivalent temperture.

12. A method as in claim 7 further including the step of correcting said indication to provide a rectal equivalent temperture.

13. A method as in claim 7 wherein said empirical data set represents actually measured thermometer sensor outputs over a substantial number of target and ambient temperature points within the thermometer's operating range.

14. A thermometer empirical data collection process comprising:

(a) optically coupling an individual thermometer instrument to a temperature reference target, said thermometer including an infrared sensor generating an infrared flux value $\Phi_b$ and a temperature sensor coupled to the infrared sensor, the temperature sensor generating a value $T_s$ indicating the temperature of said infrared sensor;

(b) placing said thermometer instrument and said temperature reference target into an environmental chamber;

(c) controlling the environmental chamber to sweep its temperature across an ambient temperature operating range;

(d) for each of several ambient temperatures within said ambient temperature operating range, acquiring a data point consisting of the two thermometer sensor outputs $T_s$, $\Phi_b$ and the temperature of the temperature reference target; and (e) storing said data points acquired by said step (d) into said thermometer for use in looking up the temperature of a subject.

15. A thermometer testing and empirical data collection method for efficiently collecting an empirical data set for use by thermometer instruments each including an infrared sensor generating an infrared flux value $\Phi_b$ and a temperature sensor coupled to the infrared sensor, the temperature sensor generating a value $T_s$ indicating the temperature of said infrared sensor, said method comprising:

(a) mating each individual thermometer instrument with a "black body" temperature reference target;

(b) coupling said thermometer instrument and corresponding reference target together through an electrically controllable shutter;

(c) placing said thermometer instrument and corresponding black body temperature reference target and shutter into an environmental chamber (d) setting the temperature of the black body temperature reference target to a particular reference temperature;

(e) controlling the environmental chamber to sweep its temperature across the desired ambient temperature operating range of the thermometer;

(f) using the thermometer to control the shutter to open for a short time duration each time the thermometer's temperature sensor senses the next incremental temperature in a sequence;

(g) each time the shutter is opened, acquiring a data point consisting of the two thermometer sensor outputs $T_s$, $\Phi_b$ and the blackbody reference temperature;

(h) incrementally changing the temperature of the black body temperature reference to a new value and repeating steps (e)–(g); and (i) repeating said step (h) until an empirical data set has been developed to cover the thermometer's desired target temperature range.

16. A method as in claim 15 wherein said repeating step (i) includes the step of covering a thermometer target temperature range of 94° F. to 108° F.

17. A method as in claim 15 wherein said step (h) comprises the step of changing the temperature of the blackbody temperature reference by 0.5° F.

18. A method as in claim 15 wherein said sweeping step includes the step of sweeping the temperature of the environmental chamber from 60.8° F. to 104° F.

19. A method as in claim 15 wherein said shutter opening step comprises opening said shutter for each 0.1° F. ambient temperature increment.

20. A method as in claim 15 wherein said shutter opening step comprises opening and closing of the shutter under control by the thermometer.

21. An infrared thermometer empirical data collection system comprising:

an infrared thermometer including an infrared sensor generating an infrared flux value $\Phi_b$ and a temperature sensor coupled to the infrared sensor, the temperature sensor generating a value $T_s$ indicating the temperature of said infrared sensor;

an environmental chamber for holding said infrared thermometer and a temperature reference target;

means for optically coupling, within said environmental chamber, said thermometer to said temperature reference target;

means coupled to said environmental chamber for controlling the environmental chamber to sweep its temperature across an ambient temperature operating range;

means coupled to said thermometer sensors for acquiring, for each of several ambient temperatures within said ambient temperature operating range, a data point consisting of the two thermometer sensor outputs $T_s$, $\Phi_b$ and the temperature of the temperature reference target; and lookup means coupled to said acquiring means for storing said acquired data points into said thermometer for use in looking up the temperature of a subject.

* * * * *